United States Patent [19]
Baker et al.

[11] Patent Number: 5,210,689
[45] Date of Patent: May 11, 1993

[54] SYSTEM AND METHOD FOR AUTOMATICALLY SELECTING AMONG A PLURALITY OF INPUT MODES

[75] Inventors: Bruce R. Baker; Robert V. Conti, both of Pittsburgh, Pa.; David Hershberger, Millersburg, Ohio; Donald M. Spaeth, Bethel Park, Pa.; D. Jeffrey Higginbotham, Buffalo, N.Y.; Clifford Kushler, Wooster, Ohio

[73] Assignee: Semantic Compaction Systems, Pittsburgh, Pa.

[21] Appl. No.: 633,535

[22] Filed: Dec. 28, 1990

[51] Int. Cl.[5] .............................................. G09B 21/04
[52] U.S. Cl. ............................... 364/419; 364/709.15; 434/116; 341/22
[58] Field of Search ............... 364/419, 709.12, 709.15, 364/709.16; 381/51; 434/112, 116; 340/711, 706, 722; 400/485; 341/21, 22, 26, 28

[56] References Cited

U.S. PATENT DOCUMENTS

| | | | |
|---|---|---|---|
| 4,215,240 | 7/1980 | Ostrowski | 381/51 |
| 4,241,521 | 12/1980 | Dufresne | 434/112 |
| 4,438,505 | 3/1984 | Yanagiuchi et al. | 364/419 X |
| 4,486,741 | 12/1984 | Nozawa et al. | 341/22 |
| 4,650,927 | 3/1987 | James | 379/96 |
| 4,661,916 | 4/1987 | Baker et al. | 381/52 X |
| 4,674,112 | 6/1987 | Kondraske et al. | 379/96 |
| 4,737,980 | 4/1988 | Curtin et al. | 379/97 |
| 4,866,759 | 9/1989 | Riskin | 379/97 |
| 5,031,206 | 7/1991 | Riskin | 379/97 |

FOREIGN PATENT DOCUMENTS

| | | | |
|---|---|---|---|
| 8200381 | 2/1982 | World Int. Prop. O. | 434/116 |
| 8900324 | 1/1989 | World Int. Prop. O. | 434/116 |

OTHER PUBLICATIONS

Med. & Biol. Eng. & Comput., vol. 17, Jan. 1979, Friedman et al., "Verbal communication aid for nonvocal patients", pp. 103–106.

Med. & Biol. Eng. & Comput., vol. 15 Mar. 1977, Shwedyk et al., "Communication aid for nonvocal handicapped people", pp. 189–194.

Conference: Eurocon '77 Proceedings on Communications, Venice Italy, May 3–7, 1977, Cossalter et al., "A Microcomputer-Based Communication System for the Non-Verbal Severely Handicapped", pp. 4.1.2(1)–(7).

Primary Examiner—Robert A. Weinhardt
Assistant Examiner—David Huntley

[57] ABSTRACT

A continuous input system allows a system operator to continuously input a plurality of polysemous icon symbols to access stored morphemes, words, phrases, or sentences corresponding to an icon sequence. The system, with automatic mode selection for the input system, containing a plurality of character and symbol keys, allows for automatically selecting of the icon mode, a character or word prediction mode, and even a subsequent suffix mode, to allow a user to enter morphemes, words, phrases, or sentences sequentially. Further, by utilizing the character and word prediction modes, including the suffix mode, words, phrases or sentences corresponding to non-accessible icon sequences can be automatically activated without having to manually switch out of the icon mode or select the character and word prediction mode. Such automatic icon, word prediction, character and suffix mode selecting, thereby allows continuous text or speech generation with a minimal number of input key activations necessary for a system operator.

62 Claims, 10 Drawing Sheets

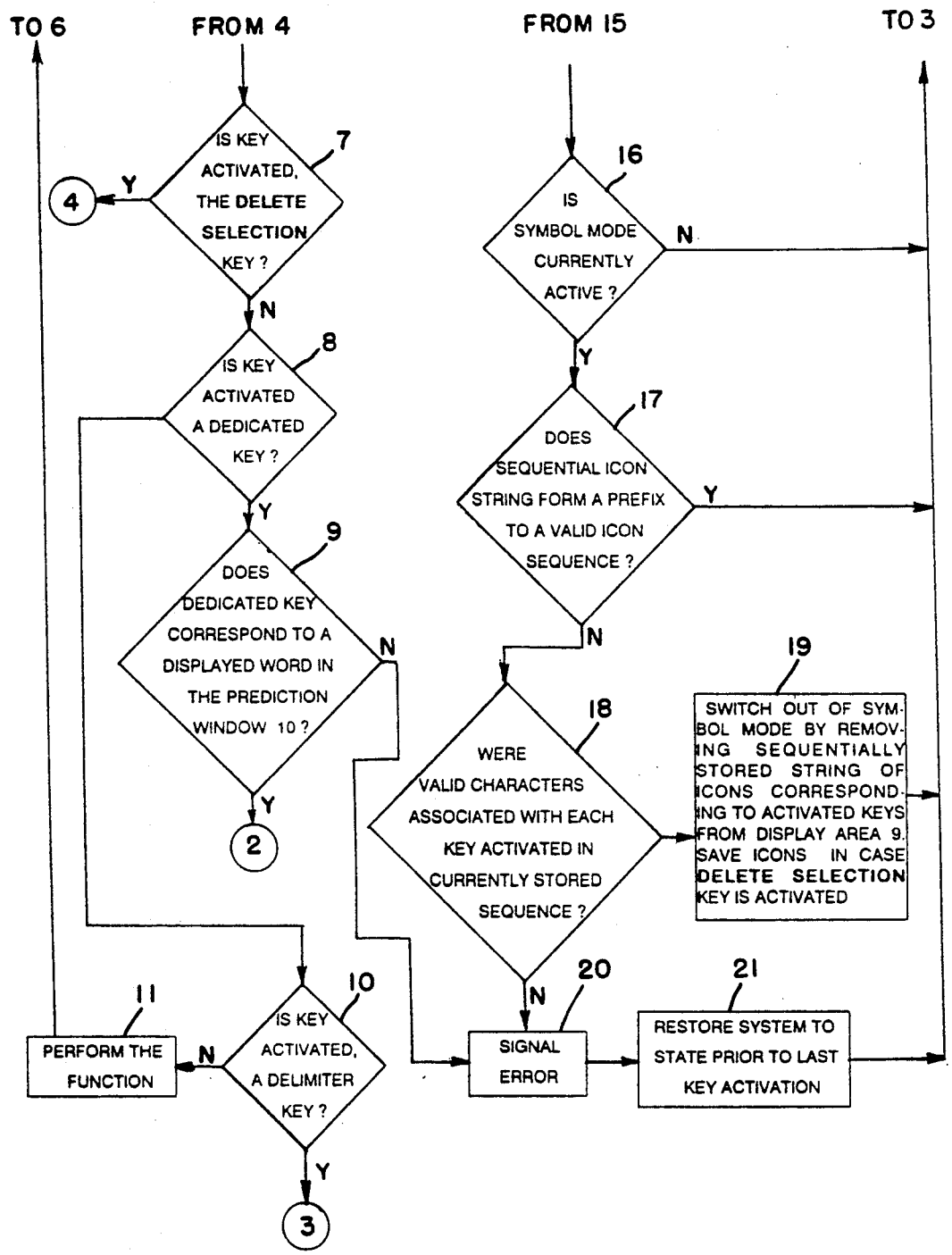
FIG.5a(II)

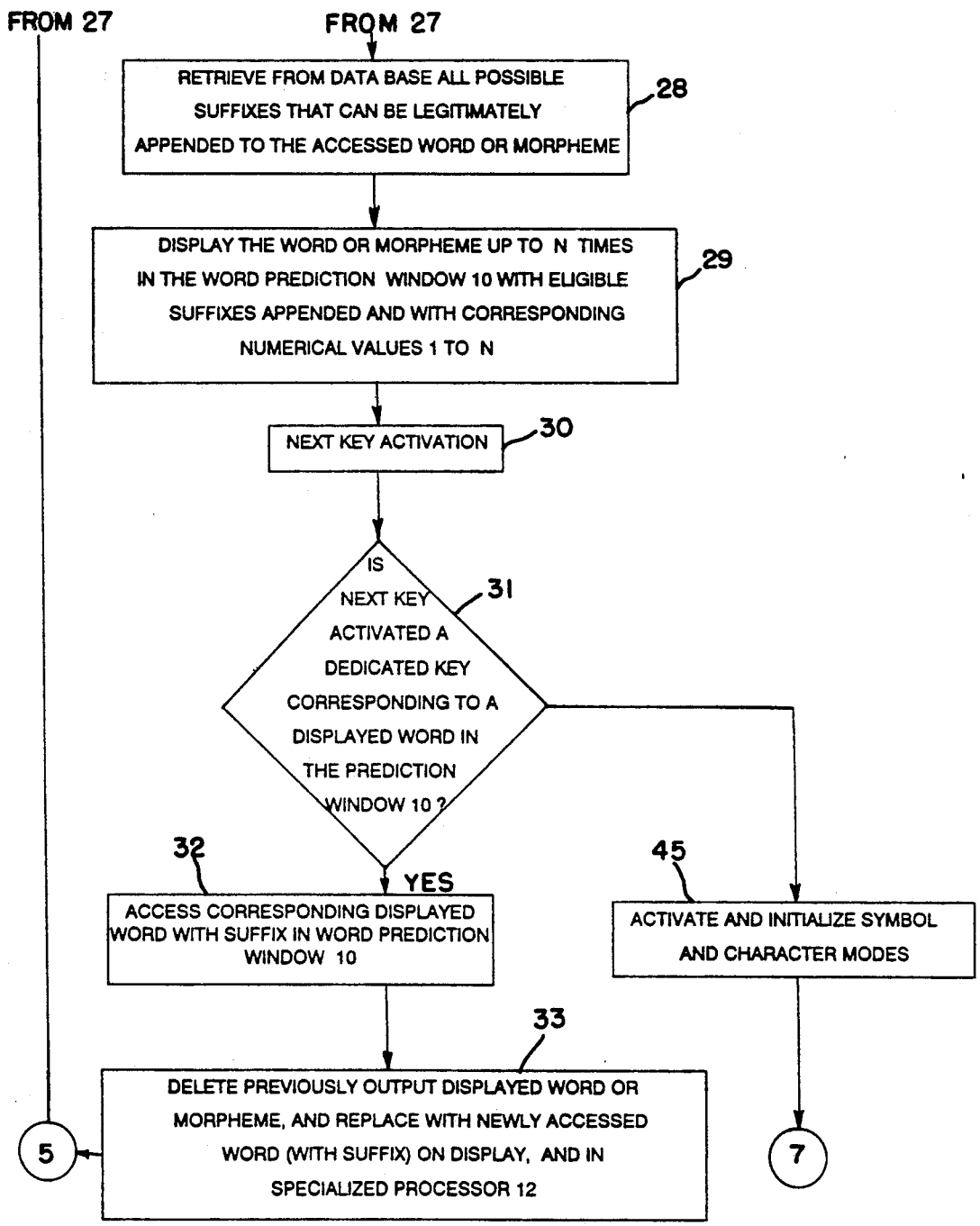
FIG.5b(II)

SYSTEM AND METHOD FOR AUTOMATICALLY SELECTING AMONG A PLURALITY OF INPUT MODES

FIELD OF THE INVENTION

The present invention relates to an input unit in general, and more particularly to a system and method for implementing the automatic selection of an input unit among a plurality of input modes, without the need of a mode selection key solely utilizable for selection among a plurality of input modes.

BACKGROUND OF THE INVENTION

A system and method for producing synthetic words, phrases, or sentences for use by people unable to use their own voices is known in the speech synthesizing arts. The system was originally implemented as a linguistic coding system with an associated keyboard, in which the coding system was based on using multimeaning icons to represent language rather than using indicia related to a specific word, phoneme, or letter. Such a system is disclosed in U.S. Pat. No. 4,661,916 to Baker et al issued Apr. 28, 1987, incorporated herein by reference.

In the Baker system, the keyboard is coupled to a computer which stores a plurality of words, phrases or sentences in the memory thereof for selective retrieval by the keyboard. The words, phrases or sentences retrieved from the keyboard are fed to a voice synthesizer which converts them through a loudspeaker to achieve audible spoken messages. The keyboard utilizes polysemic or polysemous (many-meaning) symbols on a plurality of respective keys and by designating one or more of the keys and its associated polysemous symbol, previously recorded words, phrases, or sentences from the computer memory may be retrieved in a simple transduction manner. These words, phrases or sentences are retrieved by actuating a particular sequence of a plurality of keys, to vary the context of the polysemous symbols. Thus, a plurality of words, phrases or sentences associated with a symbol sequence may be selectively generated as a function of each polysemous symbol in combination with other symbols to access the word, phrase, or sentence.

A communication aid designed to be adaptable either to people of high intellect and education who are physically unable to speak or to people with decreased cognitive abilities or little education, needs to be easy to understand and operate, as well as quick and efficient. It is essential that both the cognitive and physical loads required of the user be reduced as much as possible. It is essential as well that whatever language representation system is used it must be capable of representing a large enough vocabulary to be useful in spontaneous, interactive communication in a variety of settings. Systems other than Baker '916 for synthetic speech or text generation devices have been developed, which have coding systems based on words, phonemes, or letters to be implemented by keyboards with indicia thereon relating to specific words, phonemes, or letters and are somewhat limited in efficiency of operation.

An advantage in utilizing a system based upon letters is that a limited number of keys can be used (i.e., 26 letters in the alphabet). However, such a system utilizing letters has several drawbacks. One drawback is that in a system for people physically unable to speak or who are cognitively impaired, spelling is difficult to master. People who can't articulate the sounds of a language have a limited ability to deal with letters which represent those sounds. Also, when using letters one must type a large number of letters in a sequence to form a word, phrase and especially a sentence. Such a large number of keystrokes is especially cumbersome for someone with decreased cognitive or physical abilities.

In order to combat the problem of the need for a large number of letters in a sequence, single meaning picture or symbol approaches have been developed. In these systems, a symbol or picture can be utilized to represent a single basic concept or word. Because these systems are based upon single concepts or words and not letters, only a few symbols need be utilized in sequence to represent a phrase or sentence. However, the major drawback of these systems is different from letter based systems. Although only a single symbol or a few symbols can form a sequence to represent a meaningful utterance, many hundreds of symbols are needed in such a system to represent enough vocabulary to spontaneously and appropriately interact at home, at school or in the workplace. Thus, hundreds and sometimes even thousands of symbols are used by operators of these systems. These large symbol sets are not only physically difficult (if not impossible) to represent on a keyboard, but also put a severe strain on the cognitive and physical abilities of a user both to choose a symbol from the large symbol set and further to key in the selected symbol.

Various techniques have been developed in an attempt to deal with the deficiencies of either the need for a large number of letters to form a sentence in a letter-based system; or the need for a large symbol set to represent all the notions or vocabulary necessary for daily interactions in a single-meaning picture/symbol system. One approach aimed at combating the long sequences of letters necessary in a letter system is the use alphabetic abbreviations. With such systems a user is unsure as to what each abbreviation stands for, for example, (wk) could stand for "walk". However, it could also stand for "weak", "week", or "walk". The abbreviation (wo) could stand for "word", but what would stand for "work". System operators become confused and need to remember hundreds of special rules, exceptions and frankly arbitrary codes.

Another attempt to alleviate the large number of keystrokes needed in spelling is letter-based word prediction systems. In such a system, a user types a letter such as "B" and a plurality of words starting with "B" appears on a display. Upon not finding the desired word displayed, an operator then hits the next letter "0" of the desired word (if the desired word were "Bottle" for example). If the desired word is then displayed on the word list the number next to the desired word is noted and then hit. Such systems are highly visual requiring attention directed at two different fields, the keyboard and the word list. To use these to enhance communication rate requires systems operators to have strong spelling abilities (if an operator hits the wrong letter such as "C" when the word "kitten" is desired, prediction starts with a plurality of words beginning with "C" and the user is thus lost). Further, such systems can be cognitively disorienting because they require the operator to key a letter, read a word list on a display, key in another letter, select a number, etc.

Levels/locations systems were developed in an attempt to alleviate the problems caused by large symbol sets of single meaning picture/symbol systems. In such systems, a plurality of keyboard overlays is utilized. Each overlay contains a plurality of single-meaning pictures or single concept symbols for a particular activity. For example, there could be a "party" overlay, a "going to the zoo" overlay, an A.M. activities overlay, etc. However, because only a limited number of symbols is on a keyboard at one time, the system severely limits a user's vocabulary at all times. In the case where a user has 7 overlays and an even distribution of vocabulary is assumed for each overlay, 85% of the vocabulary is unavailable to the user. The rest of the vocabulary is on the other six overlays. Even if the disabled user is physically or electronically able to change overlays, the vast majority of his or her vocabulary is out of sight at all times. Thus, the interactive communicative abilities of a user are severely limited.

The linguistic coding system of Baker '916 solved a great number of these problems by employing a technique called semantic compaction. Semantic compaction utilizes a keyboard with polysemous (many-meaning) symbols or icons on the respective keys. These polysemous symbols allow for a small symbol set (each symbol having many different yet obvious meanings depending upon symbol context) and further allow the use of only a small number of symbols in a sequence to transduce a previously stored word, phrase, or sentence. An example of the polysemous symbols of the Baker '916 patent are shown in FIG. 1. Thus, by input of only a limited number of polysemous keys, a word, phrase or sentence can be selectively retrieved. The sentence can then be sent to a voice synthesizer to convert it, through a loudspeaker, to an audible spoken message. This device is a synthetic speech device which allows a user to go directly from thought to speech without the need to record words, phonemes and letter data of individual entities.

The Baker device stores words, phrases or sentences for selective retrieval, and not just individual words, phonemes, or letters directly represented on the keys of other systems. By using a small set of polysemous symbols, in combination, only a small number of key actuations is necessary to represent a word, phrase or sentence. These iconic, polysemous (many-meaning) symbols or "icons" for short, as they are more commonly known, on the individual keys, were made so as to correspond to pictorial illustrations of real life objects, as can be seen by reference to FIG. 1. These icons are utilized for storing large vocabularies because such symbols are more easily memorized for large vocabularies because they are more versatile than alpha-numeric characters. Large repertories of words, sentences and phrases are available and used by operators with a wide range of physical and cognitive disabilities. Many operators handle repertories in excess of 3000 vocabulary units.

A sequence of icons may be associated with a particular language item, such as a word, phrase or sentence, to be output when that particular icon sequence is actuated. A small total number of icons, in short sequences, can be used to access language items. They do what letters, single meaning pictures, single concept symbols, words and numbers cannot do.

Thus, a significant advantage which icons have over numbers, letters and words, is that, as illustrations, they each have distinct visual features which are transparent or can easily be made transparent (translucent) to the user. For example, each icon has a shape, and a color, and illustrates some object which may have other visual properties and practical associations as well. Although some symbols have shapes which are readily accessed (for example, 0, I, X, A), the abstract shapes of symbols are not unambiguous; the more abstract an association, the greater the chance the user will not prefer or remember the intended interpretation. For example, "A" can be associated with a house or a mountain or a tall building, the tip of a pencil, etc. Since the shape of "A" is so abstract, many associations are possible. An icon of "house", however, is not subject to the same ambiguity.

Some electronic systems have attempted to use letter coding to associate letters with words, phrases and concepts; however, this method of encoding is also prey to ambiguous interpretation. For example, a reasonable letter coding for the color "RED" could be the letter "R"; for "BLUE", the coding could be "B". However, what happens with the color "BROWN"? The logical choice would also be "B", but a conflict arises with the code chosen in "BLUE". The same problem arises as in the previous paragraph; since there are literally thousands of words which can be associated with a single letter, a single letter encoding technique rapidly runs out of coding space. A two letter encoding technique rapidly runs out of coding space as well because there are only 676 possible two letter codes. Further, a large number of these codes are difficult to associate with words, phrases or concepts such as xx, xy, xz, yx, yy, yz, zx, zy and zz, for example.

Letter codes can be done in various ways. Two of the most common ways to encode single and plural word messages are called "salient letter encoding" and "letter category encoding". Salient letter encoding takes the initial letter of two or more fundamental words in the language string to be represented and uses them for the code. Using this method, for example, "Turn the radio off" can be encoded as "RO" (RADIO OFF). The problem arises that after many utterances, the same letters "RO" are needed to represent other language strings. For instance, "RO" are the most salient letters for "Turn the radio on". A strategy must then be employed to find other salient letters so that the ambiguity is avoided. Hence, "Turn the radio on" must be encoded using a different code such as "TO" or "TR". However, these letter combinations in turn can represent other common phrases such as "Take it off" or "Turn right". As the language corpus grows larger, the task of finding other unique combinations of salient letters becomes more and more difficult and by necessity must include codes that are less and less salient and more difficult to learn. After 500-1000 units are encoded, the codes become virtually arbitrary.

Letter category encoding takes letters to associate with concepts rather than individual words, so that "F" can be taken to represent food. The plural word message "I would like a hamburger" would then be encoded by "FH". The difficulty here is that "F" can represent many different concepts and would be the most memorable selection used not only for "food" but for concepts such as "family", "friends", etc. If each letter is assigned a single concept, a language corpus represented by the combinations of twenty-six root concepts would indeed be impoverished. If letters are allowed to represent one concept in initializing a sequence, and other concepts as second or third members of a sequence, disambiguating which concept a letter means across a string of three letters becomes a difficult if not impossible task once the language corpus has grown to five hundred units or more.

Thus, the semantic compaction encoding technique in Baker '916 is a revolutionary break through in electronic augmentative and alternative communication over alphabetic encoding, levels-location systems and frequency recency letter based word prediction techniques. However, several limitations may occur in the Baker '916 type of input unit for augmentative communication and other types of speech synthesis systems. Further, several limitations also exist in the area of text generation. In the Baker '916 device, the alphabetic characters appear on the same keys as the polysemous icons, not only to enhance the general associational power of each key viewed as an associational environment, but also to use space more efficiently and to reduce the total number of keys for scanning input users. Thus, there is a problem when, for example, a user desires to enter words or phrases which have not been designated by polysemous symbols (for example, the name of a specific city), the user must hit a key designating a particular type of spell input mode and then input a plurality of alphabetic characters to spell the name of the particular city. Still further, upon spelling the name of the particular city, a user must then access a symbol or communication mode key to then place the unit back into the symbol mode. Specific names of cities and specific names of people and specific technical terms, for example, are prevalent in a scholastic environment and thus may be crucial in an area such as text generation.

As previously mentioned, word prediction systems are utilized in an attempt to alleviate the large number of keystrokes needed in spelling. However, due to the previously mentioned problems of requirements for strong spelling abilities as well as the cognitive disorientation of continuous keyboard to display viewing adaptations, the word prediction system pose several drawbacks in a speech synthesis environment which were overcome by the semantic compaction system of the Baker '916 patent. The problems involved with word prediction systems are equally present when such a system is utilized in a text generation environment.

In text generation, a plurality of additional words are required, which were probably not as essential in speech synthesis. The lexicon used in interactive communication is often smaller than that used in writing. For example, a student in school may be required to generate a paper on "Christopher Columbus". In a scholastic environment, historical names such as "Christopher Columbus" are common. However, in a word prediction system, even if "Christopher Columbus" is present within the system, a user would probably have to enter several letters before the name "Christopher Columbus" ever appeared on a word prediction display. This is because many other common words beginning with "C", "Ch" (cheap, choose, chase, check, chip, chemistry, etc.), and even "Chr" exists, which must be available to a user. The presence of frequently used daily vocabulary hinders the generation of academic vocabulary. Yet even in academic settings these common words need to be readily available to system operators. Thus, a slow, and otherwise cumbersome system exists in word prediction for text generation.

Although the Baker '916 system is the best available system in augmentative and alternative communication, there is still room for improvement with the input system of the type utilized in the '916 patent to Baker, which produced synthetic words, phrases or sentences. With the input icon keys, as well as characters associated with a plurality of the keys, selection, in the '916 Baker patent, between the character mode and the symbol mode is necessary for the input unit to allow for generation of specific cities or people, or other words not already encoded by icon sequences. A separate spell mode key and icon mode (comm. mode) key (for the symbol mode) has to be accessed by the user in the Baker '916 system in order to select and switch between the character and symbol modes, and switch back again. Such mode selection keys are illustrated in the background FIG. 2 herein, which was previously utilized and developed by Bruce Baker, one of the present applicants.

In this type of system, a plurality of icons or character keys are utilized to access words, phrases or sentences previously stored in memory. However, upon selecting the respective icons associated with an encoded word, phrase or sentence, a user has to switch to, or select a character mode by activating the spell mode key in order to allow character input. This is somewhat cumbersome to the user, especially in the area of text generation, and could significantly increase the access time necessary to generate a word, phrase, or sentence. Further, upon completing input in the character mode, a user then has to actuate the communication mode key to put the input unit back in, or select the symbol mode. Again, this is somewhat cumbersome and could effect the input speed of the input system.

SUMMARY OF THE INVENTION

The present invention has been developed with the object of providing an improved input unit for text synthesis generation wherein selection among a plurality of input modes is automatic and a key designated solely for selecting an input mode is unnecessary. In a preferred embodiment, the present invention is directed to a text generation system. Further, with this improved input unit of the present invention, an improved system can be achieved for speech synthesis, language translation, or a plurality of numerous processing systems utilizing both characters and icons wherein selection of character mode or an icon mode, for example, occurs automatically, without the need for a separate mode selection key being activated According to the objects of one embodiment of the present invention, an automatic mode selection system has been developed for selecting an appropriate input mode of an input unit, including a plurality of input keys of a processing system, between a predictive word mode, sequential character mode, suffix mode, and a symbol mode, for example. Such a system provides continuous input for use in sequential word generation, preferably text generation. In such a system, a key input device provides for activation of each of a plurality of input keys of the input unit, the key input device including a plurality of keys with both an iconic symbol and an alphanumeric character. Upon activation of a key, corresponding symbols and/or characters are then input and stored.

Further, prior to the input of any symbols or characters corresponding to any input keys, a word prediction dictionary is established. This word prediction dictionary allows for, upon accessing a particular character, or string of characters, display of five to eight words, for example, corresponding to the input character or character string. However, such a word prediction dictionary is one not necessarily containing all readily utilizable words, but is one in which all words accessible by an icon sequence may optionally be deleted. Thus, after the iconic encoding system is learned, only words not already encoded by icon sequences will appear on prediction lists. Therefore, if a user desires a specific word not already encoded by an icon sequence, such a word will appear on a display quickly and efficiently for access by the user. This system will then incorporate full advantage of both the iconic sequencing to access a morpheme, word, phrase or sentence as well as word prediction. This is because common words will not have to appear in the word prediction mode which, in prior word prediction systems, would slow a system down when a user desired a specific word such as "Christopher Columbus," such common words being accessible by the previously established superior iconic mode systems.

A comparison device compares an input to a saved symbol sequence, upon entry of each new symbol, to a plurality of predetermined and prestored symbol sequences to determine a symbol sequence match. Upon detecting a symbol sequence match, the prestored morpheme, word, phrase or sentence corresponding to the matched symbol sequence is then accessed. The accessed morpheme, word, phrase, or sentence can then be displayed, potentially modified via a suffix mode, output to a specialized processor, and subsequently output to a printer.

Further, in another preferred embodiment, the comparison device compares an input and subsequently saved character string, upon entry of each new character, to access a plurality of predetermined and prestored words (these words being primarily word roots in order to enable a larger vocabulary access from predicted word lists) in the word prediction dictionary to establish and display a word list. From this displayed list, a word can be selected, via one of a plurality of dedicated keys, and subsequently accessed and displayed.

Further, in another preferred embodiment, the word or morpheme accessed via word prediction (or via the symbol mode) may be modified via suffix prediction. A plurality of suffixes useable with that word or morpheme can be accessed via a suffix dictionary, for subsequent display with the word or morpheme for selection and output via dedicated numerical keys. The selected word, phrase, or sentence is subsequently accessed, displayed and output.

A key detection device further detects when a predetermined key or a predetermined number of the plurality of input keys have been activated. Upon detection of a delimiter key being activated, for example, the space key which visually signifies word separation to a user in sequential word generation, the input character string is then output. This is because upon detecting activation of a delimiter key, an input mode automatic selection device selects the character mode allowing character string output.

Upon detecting that the current input icon sequence neither matches a valid, existing prestored sequence, nor is a prefix of such a valid sequence, the input mode automatic selection device then automatically switches the input unit out of the iconic symbol mode. The input device then inputs alphanumeric characters, to the system, one or more corresponding to each of the plurality of input keys activated, such that a desired word can be selected via word prediction or suffix prediction, or a character string (numeric or alphabetic) can be entered through normal character input.

In a further preferred embodiment, upon switching the input unit out of the iconic symbol mode and prior to inputting characters to the processing system, a display device exists for displaying a plurality of word prediction choices and suffix prediction choices corresponding to the plurality of input characters. Subsequently, one of a plurality of dedicated numerical keys may be used for selecting one of the plurality of displayed words for subsequent output and thereby automatically switching the input unit back to the symbol, character and word and suffix prediction input modes.

In a further preferred embodiment of the present invention, upon automatically selecting the character mode of the input unit by detecting that a delimiter key (for example, the space key which visually indicates word separation to a user) has been activated with the input unit previously in the character and word and suffix prediction mode, the device then automatically switches the input unit back to include the symbol mode. Further, upon detecting this delimiter key, the input character string is output to a specialized processor, if necessary, and to a printer, for example, and subsequently the input unit is switched back to include the symbol mode, thereby allowing for input or access of a next word for continuous word generation.

It is therefore an object of the present invention to employ an automatic mode selection input device and method for selecting an input mode of the input device, including a plurality of input keys, the selectable input mode including a character and word and suffix prediction, and symbol mode, prior to output to a processing system or output device.

It is another object of the present invention to employ a method for automatically selecting an input mode of an input unit of a continuous input and word generation system, the input unit including a plurality of input keys, as a character, word and suffix prediction or symbol input mode.

It is a further object of the present invention to employ such an input unit and method in a text generation system, a language translation system, speech synthesis system, or any similar type processing system capable of processing input data.

It is a further object of the present invention to further improve the rate of data generation in a computational system using encoded retrieval of data through sequences of multimeaning icons in an input device or word generation system.

It is a further object of this invention to use a microcomputer system and method to examine the incoming stream of keystrokes and automatically determine when the user is spelling, desires word and suffix prediction, and when the user would desire to perform iconic encoded retrieval. Although this feature will later be described in more detail, in general, a return to include the iconic encoding input mode will take place after the user enters a delimiter key indicating he has completed spelling a word, and the input alphanumeric characters have subsequently been output. The system and method will switch out of iconic coding, to include only spelling and word and symbol prediction modes, whenever the preceeding keystrokes, if interpreted as icons, would fail to define a sequence with a stored vocabulary unit or a prefix of such a sequence, and when the characters form a valid spelling sequence.

It is a further object of this invention to implement a word prediction feature whenever the user enters alphabetic characters into the input device or word generation system. The predictor is activated immediately subsequent to the system determining, for each input entry, that the user's keystrokes do not represent a completed iconic sequence.

It is a further object of this invention to optionally exclude, in the method and system of the present invention, from the word predicted vocabulary all or some words, phrases, sentences or morphemes that can be retrieved by iconic encoding, depending upon the choice of the user or user's assistant. Hence the word predictor display will not be cluttered with common words. It will very quickly predict after two or three keystrokes, uncommon words. If a user sees his/her word on the word prediction display after only one or two keystrokes he could thus have the opportunity to select it at once and thus does not need to spell the word in its entirety.

It is a further object of this invention to utilize a system and method which stores with each word or morpheme in the iconic encoding and word prediction data bases, a list of eligible suffixes that can legitimately be appended to that entry. When it is determined that a word or morpheme has been accessed, the display will show up to eight versions of that word or morpheme with eligible suffixes appended for user selection.

These and further objects of the present invention will become more readily apparent for a better understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the invention, and wherein.

DETAILED DESCRIPTION OF THE PREFERRED EMBODIMENT

Figure 1:
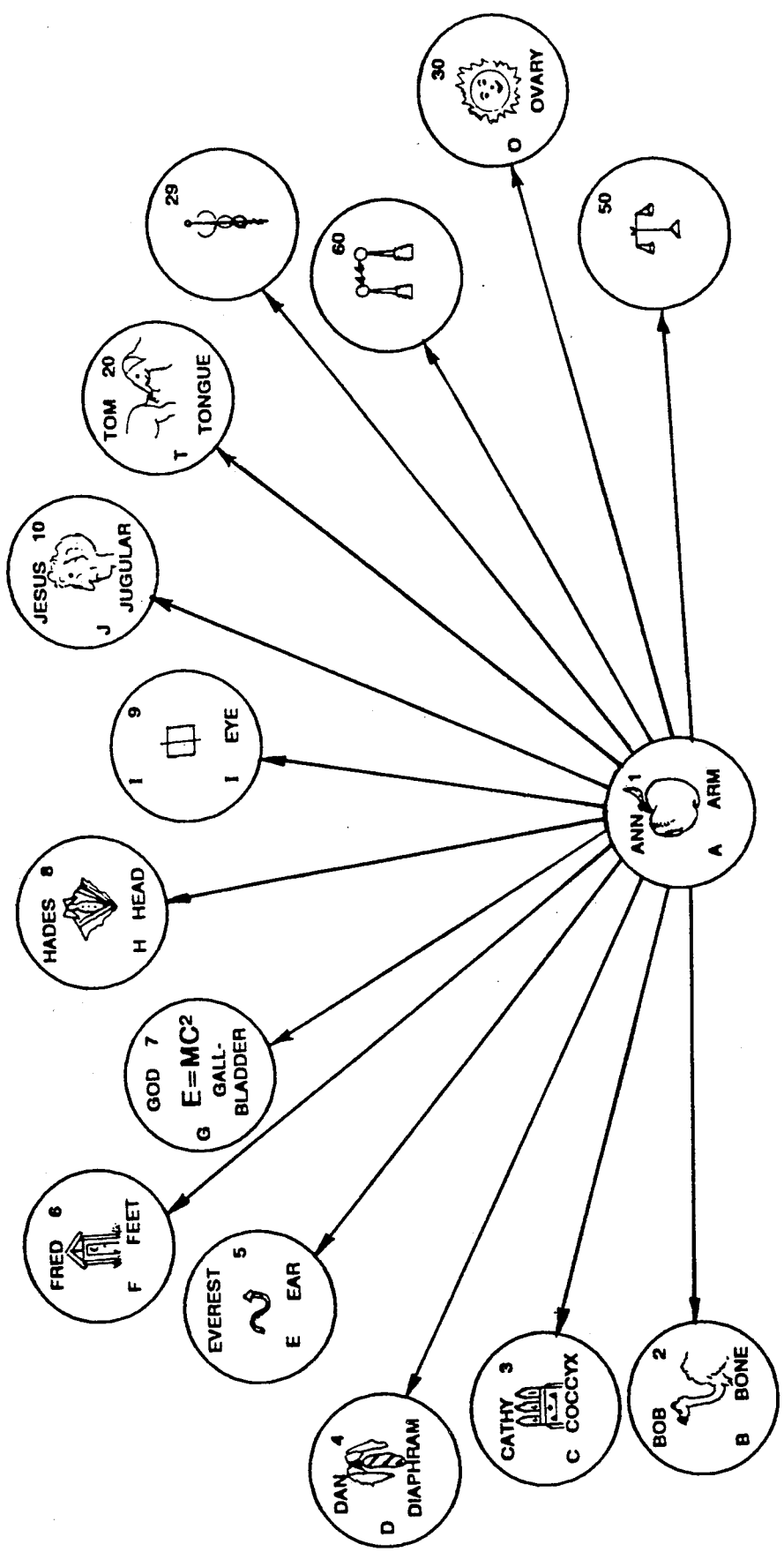
FIG. 1 illustrates a plurality of examples of polysemous symbols useable on the input unit of the system described in the aforementioned Baker '916 patent.
Figure 2:
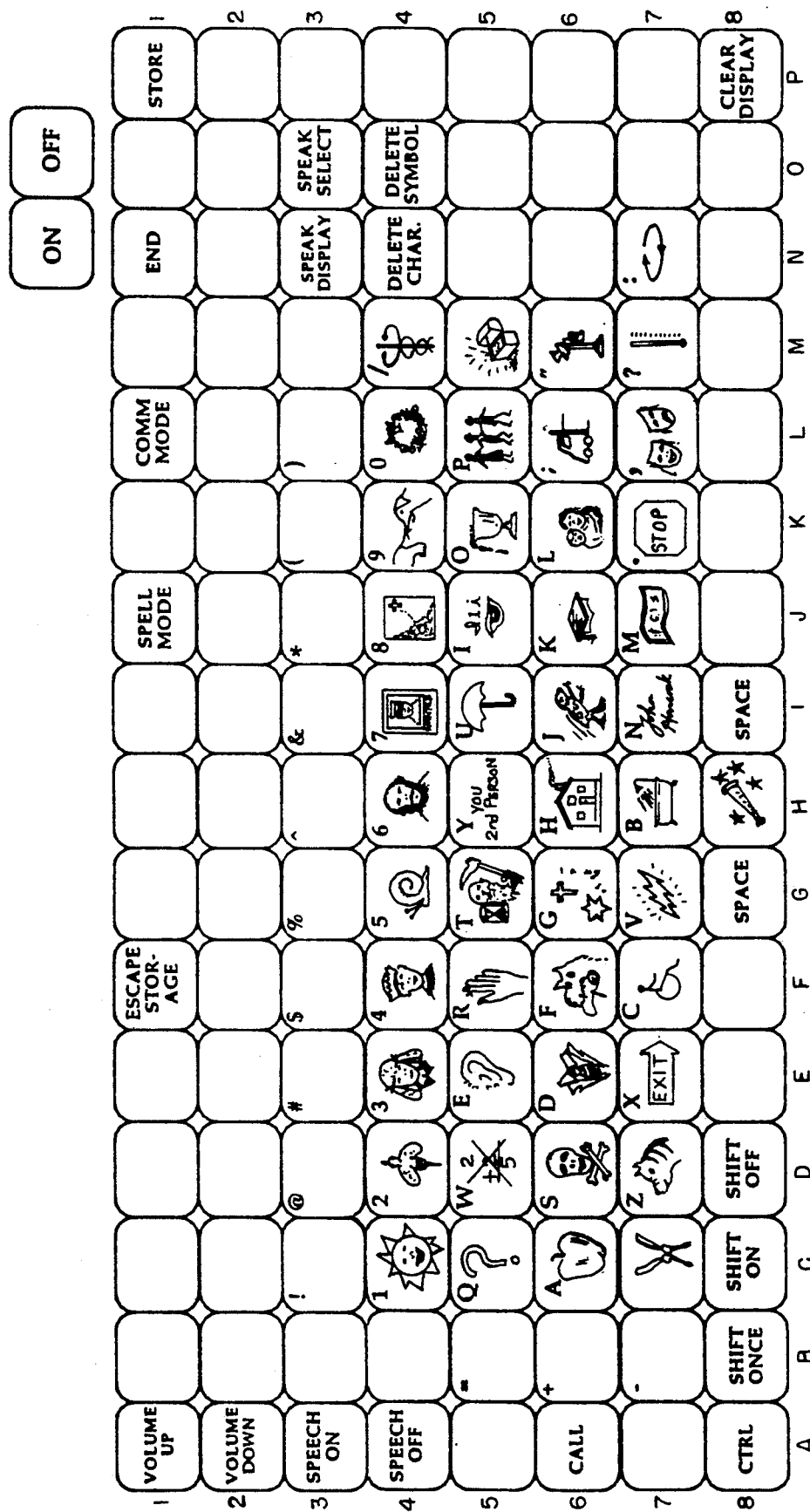
FIG. 2 illustrates an input unit such as one usable in the system described in the aforementioned Baker '916 Patent.
Figure 3:
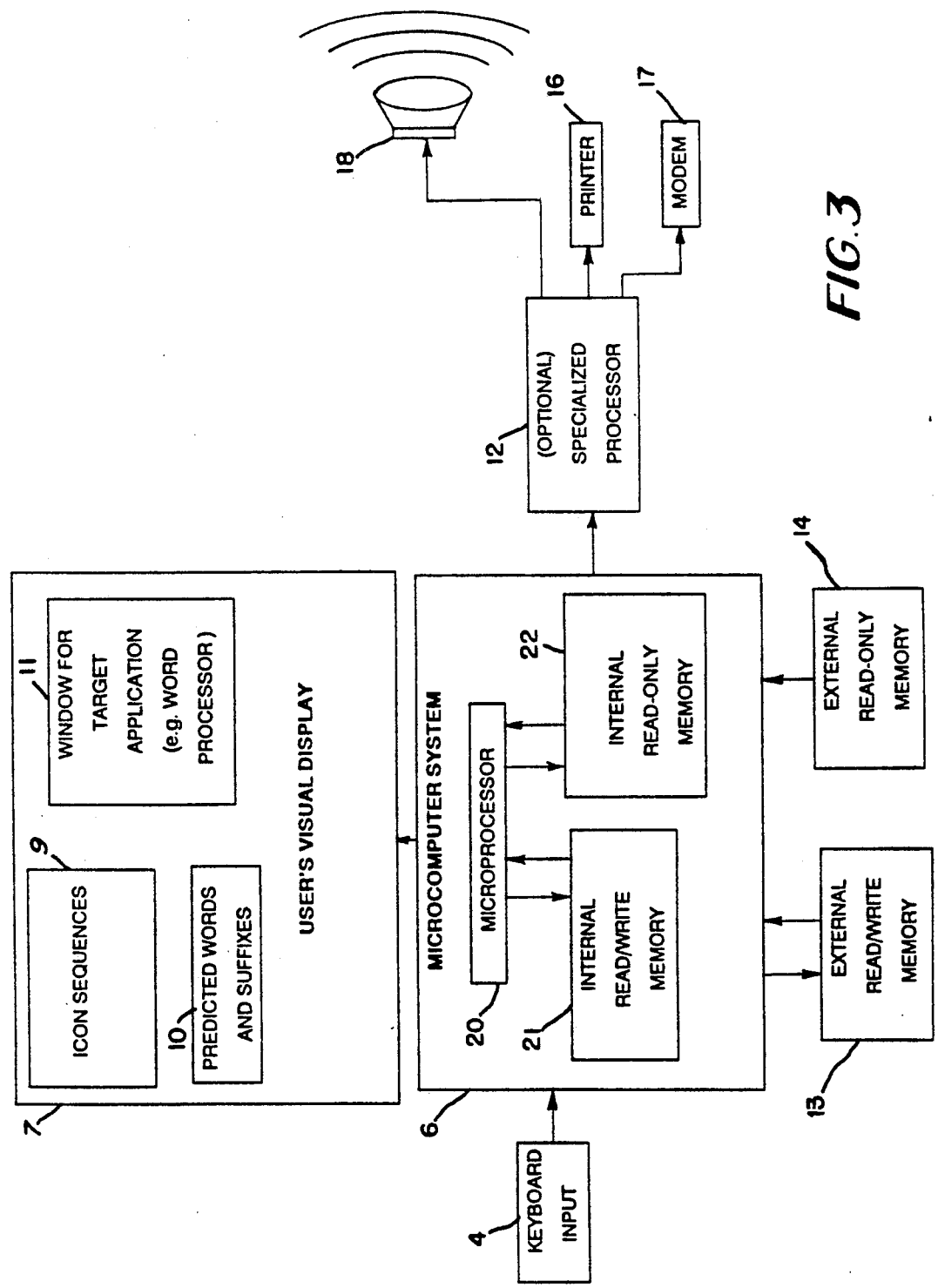
FIG. 3 illustrates the input system of the present invention in conjunction with a processing device and output units.

FIG. 3 illustrates a preferred embodiment of the present invention. In this preferred embodiment, the input system of the present invention is shown in conjunction with an optional specialized processor 12 and a printer 16 for text generation. In another embodiment, the input system can operate in conjunction with a specialized processor 12 to which data is input from the input system, then processed, and subsequently output to a modem 17, speaker 18, or any other type output device. The specialized processor 12 may be one of a speech synthesis system, or any other type of processing system, such as a language translator, for example. In another embodiment, all processing may be performed by the microprocessor 20 and thus specialized processor 12 is optional. In conjunction with the input system of the present invention and an optional specialized processor, any one of a plurality of output devices may be utilized by a user to express one of the plurality of messages input by the input system. Further, a plurality of additional output devices such as a pipe output for commercial software application (e.g., Microsoft Windows 3.0 and Macintosh System 7.0) or disk storage memory for later use, are also applicable.

Still further, it should be noted that the output device itself, for example, printer 16, could house the specialized processor 12. Thus, output from the input system could go directly to the output device, printer 16, for example. Accordingly, this aspect of FIG. 3 is merely illustrative and should not be considered limiting the present invention to output, from the input system, to a separately housed specialized processor.

These output devices can be a printer 16 for expressing the output data in printed words, in a text generation system of a preferred embodiment; a speaker 18 for outputting the accessed message in audible forms; a display device for displaying the previously accessed, and then processed message; or the like. Still further, once the morpheme, word, phrase or sentence has been accessed, processed and output by one of a plurality of output devices previously described, this output data can then be utilized in a further system such as that of a telephonic communication system, via the modem 17 or the like. Therefore, if such a system is utilized by a physically handicapped or disabled person, they are still able to communicate with the outside world in a similar manner to a person with normal ability. Therefore, the input system of the present invention, for use in conjunction with a plurality of specialized processing devices and output devices, is thus unlimited in its application to any type of communication system accessible to a person of normal abilities.

FIG. 3, as previously described, illustrates the input system of the present invention. The input system in this preferred embodiment of the present invention, includes, in combination, a keyboard 4 connected to a microcomputer system 6, including microprocessor 20 and read/write memory 21 and read-only memory 22; a display 7 including a plurality of designated, possibly overlapping, areas, 9-11 connected to the microprocessor system 6; external read-only memory 14 and changeable read/write memory 13, connected to the microcomputer system 6; an optional specialized processor 12 connected to the microcomputer system 6; and output devices 16, 17, 18 connected to the specialized processor 12. Note that the "read-only" memory 22 may be implemented as using FLASH EEPROM or some other technology which enables it to be re-written as the need arises.

Figure 4:
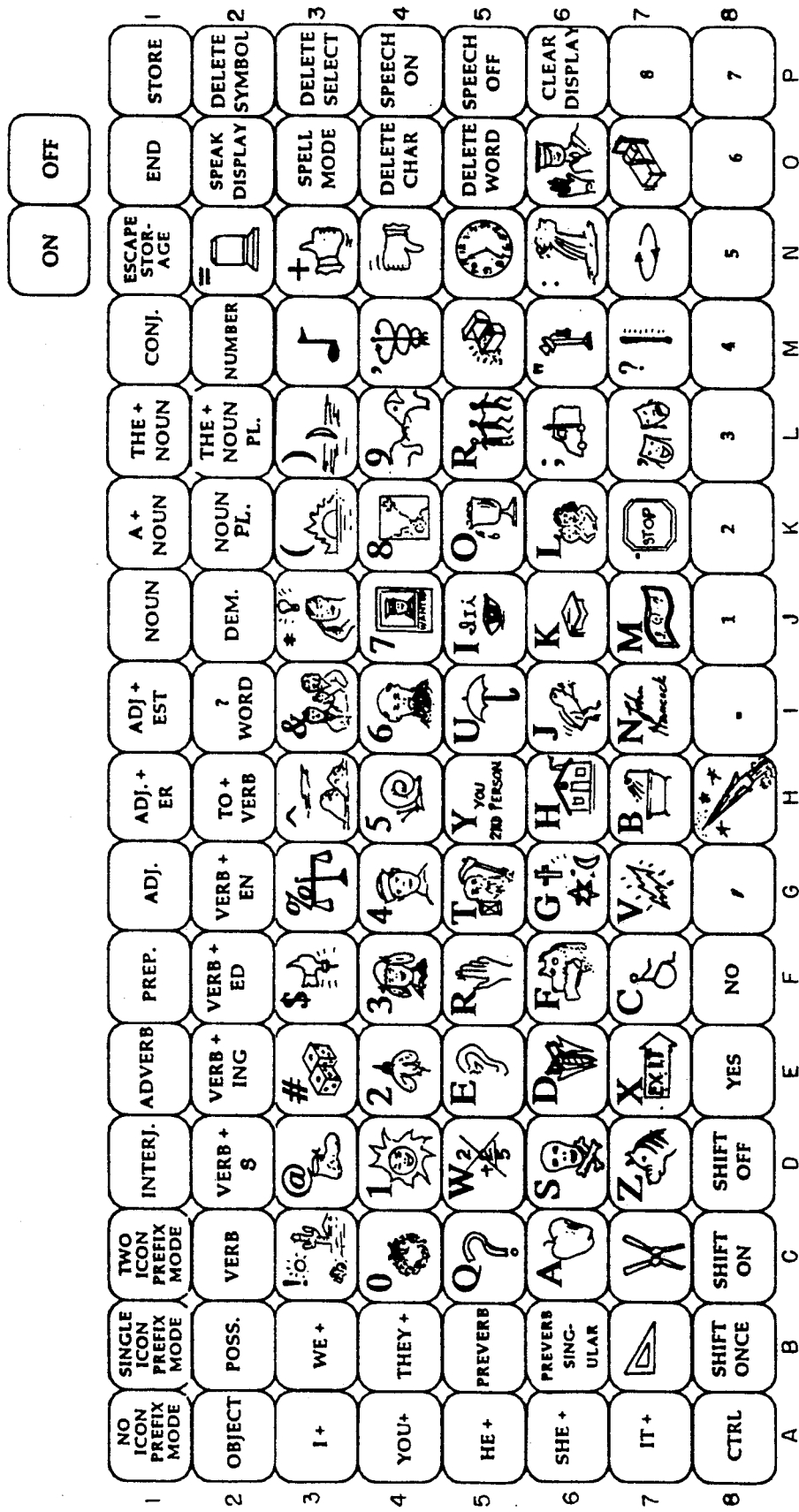
FIG. 4 illustrates a keyboard or input unit in a preferred embodiment of the present invention.

The keyboard 4, in a preferred embodiment of the present invention, is shown in FIG. 4. The keyboard 4 includes keys containing a plurality of symbols or icons which are polysemous (many-meaning) and thereby illustrate an important aspect of life and/or linguistic function. Although a keyboard 4 is utilized in this preferred embodiment, other alternative input devices are possible. One such alternative may be a scanning matrix keyboard equipped with a simple switch. Further, other similar input devices may be utilized as activation devices in conjunction with the keyboard as is known to one of ordinary skill in the art.

The keyboard may vary depending on the intellectual level of the intended operator, and further, the icons may also vary. These icons are user selectable and may be varied by the user such that icons, to which the user can readily associate, may be used. Therefore, each keyboard in itself may be a language which has been designed for or with a specific user. Each of the polysemous symbols or icons is rich in associations and in combination, signals sentence ideas in the operator's memory. This enables the generation of a morpheme, phrase, word or whole sentence by the actuation of as few as one key or as many as several keys. The keyboard 4 of the present invention may generate hundreds of sentences which may be easily retrieved from memory because of the ease with which the polysemous symbols on the keys portray the production of whole thoughts.

Although the plurality of polysemous symbols (icons) and the morpheme, word, phrase or sentence stored with an icon sequence are selectable and variable to suit a particular user (as will later be described), the system of a preferred embodiment of the present invention contains a keyboard (FIG. 4) with preselected icons and contains prestored icon sequences, each to access a common morpheme, word, phrase or sentence. Some specific examples of preselected icons and prestored morphemes, words, phrases and sentences will subsequently be described.

Icon sequences can contain one or more icons, sequentially actuated. Thus, some sequences contain only one icon, which when actuated, accesses a word. One such example is that of activating the "knot" key (below the "apple"), to access the word "not".

As previously stated, icons, each alone or in sequence with other icons, portray production of whole thoughts. Thus, icon sequences are easily recognizable and easily remembered by a user. The preselected icons and prestored icons and prestored icon sequences have been preselected and prestored based upon certain rational, easily associated, recognized, and remembered by a user; and further based upon certain semantic relationships. Further, it should be noted that the term "icon" is not limited to a pictorial illustration such as the "apple" picture. Icons such as the grammar symbols "Verb", "Verb s", "Adj.", "Noun", and "Number", to only name a few are combinable with the pictorial illustration icons, to access stored polysemous symbol sequences and corresponding icons to stored morphemes, words, phrases, or sentences. These grammar symbols are also icons (polysemous symbols) in that, in combination with other icons in icon sequences, they can be used to convey many meanings. Accordingly, an icon sequence, where hereafter or hereinbefore referred to, should not be limited to only pictorial illustration icons because any icon sequence, corresponding to a string of sequential icon keys such as those shown in FIG. 4, for example, can access a stored morpheme, word, phrase or sentence. Further, the system is not limited to use of these grammar symbols in that, if a user desires, these grammar symbol icons may be substituted by pictorial illustration icons. Some examples of icon sequences involving the grammar symbol icons are as follows.

The word "lunch" can be accessed by activating, in sequence, the "apple" icon, the "clock" icon, and the Noun icon. The underlying rational for choosing and remembering such a sequence is that "We eat LUNCH at about 11:35 (the time on the "clock" icon)."The semantic relationship is LUNCH is an associated activity (eating the apple), combined with the time reference.

Another example is that the word "twice" can be accessed by activating, in sequence, the "dice" icon along with the "Adv." (adverb) icon. The underlying rational is that TWICE rhymes with DICE and there are two (2) dice illustrated on the key. The semantic relationship is first, that of a rhyme, and second, that of the transparent representation of the illustrated entity (two dice).

Further, as is easily recognized by viewing FIG. 4, a plurality of the grammar symbol icon keys are included which, for example, will allow access of different words which are different forms of the same word. These are, for example, "Verb", "Verb +s", "Verb +en", "Verb +ing", and "To +Verb". An illustrative example of use of these icons in a plurality of icon sequences will subsequently be described.

The icon sequence of the "apple" pictorial illustration icon followed by the "verb" grammar symbol icon can access the word "eat", for example. This word is a verb, and as a verb, can take many different forms depending on desired use. One way to allow access of these different forms of the word (tenses of the verb, for example) is to include a plurality of grammar symbol icons. Thus, the user can associate the "apple" pictorial illustration icon with eating and can associate the proper verb tense by the grammar symbol icon keys. The user can thus form and easily associate each of a plurality of related icon sequences. Accordingly, the "apple" icon followed by the "Verb +s" icon, accesses the word "eats"; the "apple" icon followed by the "Verb +ing" icon accesses the word "eating"; the "apple" icon followed by the "Verb +ed" icon accesses word "ate"; the "apple" icon followed by the "Verb +en" icon accesses the phrase "to eat".

The grammar symbol icons are further not limited to the second position in an icon sequence. They can be placed in any position throughout an icon sequence and can be combined with any number of other icons to form a sequence. One example involving the "Verb" icon is that of activating the "telephone" pictorial illustration icon, then the "mountain" icon, followed by the "Verb" icon to access the word "tell". Similarly, to access another word in the same family or synonym cluster (a technique utilized to further aid the user in icon sequence-word association), the "telephone" icon, "dog" icon, and "verb" icon are sequentially activated to access the word "speak". Thus, it should be readily apparent to those of ordinary skill in the art that grammar symbol icons, similar to pictorial illustration icons, are not in any way limited to a particular position in an icon sequence. They can be readily shifted to any position in any icon sequence, combined with any other icons, and can be combined with any number (none, one, two, or three, for example) of icons, to suit a user's needs and desires. Also, similar to the pictorial symbol icons, the grammar symbol icon keys of FIG. 4 are merely illustrative and these should be in no way considered limiting; a fewer number or greater number of grammar symbol icons can be utilized.

Thus, in the preferred embodiment, a plurality of icons have been carefully chosen to allow a user to access a maximum number of words, phrases, morphemes, or sentences by a minimum number of keystrokes. Further, icons have been chosen which, in combination with other icons in icon sequences, can trigger a large number of easily remembered associations, as exemplified in the underlying rational and semantic relationship of the previously mentioned symbol sequences. However, although such a plurality of preselected icons and prestored symbol sequences have been carefully chosen to allow access of a maximum number of morphemes, words, phrases, or sentences via minimum keystrokes, the system should not be considered in any way limited to the icons on the keyboard of FIG. 4 or by the plurality of prestored icon sequences. Icons can be selected, and the system reprogrammed to recognize the icons, to suit a user's needs, capabilities and desires. Further, a plurality of icon sequences can be programmed to correspond to words, morphemes, phrases, or sentences chosen by a user, as will be subsequently described with regard to FIG. 6. Accordingly, even in the preferred embodiment, where common words, phrases, morphemes and sentences have been prestored to correspond to carefully chosen symbol sequences, other words, phrases, morphemes or sentences may be alternatively stored, along with new, user chosen, icon sequences.

The keyboard further includes keys containing one or more alphanumeric characters, which can co-exist with the plurality of icons on the keys. Therefore, a plurality of extra keys do not need to exist for the twenty-six letters of the alphabet, thereby limiting the number of keys a user must actuate. Still further, as is illustrated in FIG. 4, various numerical character keys through 9 may exist. The numerical character keys, like the character keys, also co-exist with the icons on a plurality of the input keys. Thus, similar to the alphabetic character keys, when the input unit is not interpreted in the iconic mode, the numbers, as well as the letters, can be input through the keyboard.

The numbers and letters also enhance the associated power of the associational environment established by the iconic pictorial illustrations. The alphanumeric characters can of course be disambiguated by sequence from the other pictorial and non-pictorial aspects of the associational environments established by the pictorial illustrations on a plurality of keys. One key can be designated by the word "Number" and be used in sequence, with a single or plurality of number keys to designate various numbers while the device is in the iconic mode. Further, these numbers do not need to be represented directly on a key, but can be indicated by the key's position relative to other keys on which numbers are represented as part of an associational environment. The number "8" and an icon illustrating a treasure map are joined on the same key to evoke the notion of "pieces of eight". The key directly under this associated environment, when sequenced with the key designated "Number" can indicate the word or number eighteen depending on sequential order of key activation. The key under this key can be similarly sequenced to produce the word or number twenty-eight, for example.

Further, another set of numerical keys also exist in the lower right corner of the keyboard, those keys not co-existing with icons and being dedicated for the display selection of a word in the word prediction, or suffix prediction mode. These dedicated keys are for access from the display only and thereby allow a user the ability to continuously input a plurality of morphemes, words, phrases or sentences, as will subsequently be described.

In one preferred embodiment, the microcomputer or microprocessor system 6, as shown in FIG. 3, receives input signals from the keyboard to detect which of the plurality of keys has been activated. Further, all of the processing corresponding to the character and symbol mode selection, with regard to the present invention, takes place within the microcomputer system 6. Thus, the microprocessor 20, within the microcomputer system, performs all comparisons, in conjunction with internal memory 21, as well as analysis and detection of each of the plurality of keys activated to determine symbol, character, or function, etc., corresponding to the activated key based upon a prestored program. Internal memory 21 may be a random access memory (RAM) separate from or within microprocessor 20 and the program analyzing keystroke input, being well known to those of ordinary skill in the art, may be stored with the microprocessor 20 or in a separate erasable programmable read only memory 22 (EPROM), for example. It should be noted that the system can be readily adapted to recognize new icons as the system is not limited to those shown in the figures.

Further, the microcomputer system 6 may be used to access and receive and compare stored morphemes, phrases or sentences from the memories 13 and 14. Memory 13 may include random access memory, systems (RAM), floppy disk drives, hard disk drives, tape systems, or other information storage devices known to those of ordinary skill in the art. Memory 14 is preferably an erasable programmable read-only memory (EPROM), hard or magnetic disk, optical memory, or other information storage devices well known to those of ordinary skill in the art. Further, in conjunction with the keyboard 4, the microcomputer system 6 can be utilized to program the memories 13 or 21 from memories 14 or 22 such that a morpheme, word, phrase or sentence can be programmed by the user to correspond to an icon sequence or a character sequence.

A display unit is connected to the microcomputer system 6 and can optionally be connected to the specialized processor 12. The display area 10 can be utilized in conjunction with the keyboard 4, the microprocessor system 6, the specialized processor 12, and the memories 13 or 21 programmed from memories 14 or 22, so as to display a plurality of accessed word choices (these word choices being primarily root words in order to enable a larger vocabulary access from predetermined word lists), via word prediction, corresponding to a plurality of characters input while the input system is in a character and word prediction mode. Further, upon accessing one of the plurality of word choices while the input unit is in the character and word prediction mode, the accessing of a particular word choice by activation of a dedicated numerical key on the keyboard, automatically the accessing of a character string via activation of a delimiter key, or the accessing of a stored morpheme, phrase, word or sentence via an icon sequence, activates the suffix prediction mode. Upon subsequent output of the word to a specialized processor, the system switches the keyboard and the entire input system, back to include all of the input modes. Still further, other areas of the display may be utilized to display the iconic symbol(s) corresponding to an activated key or a sequence of keys (area 9); to display a plurality of accessible words (word prediction) and accessible words with suffixes (area 10); and to display overall text to be generated as immediately accessed in a continuous fashion for text generation (output area 11).

The microcomputer system 6 includes, for example, a 16 bit microprocessor 20 in a preferred embodiment; an erasable programmable memory 22 (EPROM) for running a prestored program for analysis and detection of activated keys; and a temporary memory or storage device, such as a random access memory 21 (RAM), for temporarily storing character and icon strings, for example, determined to correspond to analyzed activated keys.

Further, each of the display areas of display 7 display characters in their corresponding areas which are stored within the microcomputer system. These memories are represented as part of internal memory 21. It further includes a display buffer represented as part of internal memory 21, such that words accessed are immediately output to the window for target application area of the display for immediate display in area 11. However, words are output to specialized processor 12 on a delayed basis. Upon accessing a word or morpheme via an icon symbol sequence of word prediction the word will be displayed, but not yet output to processor 12. Upon a user selecting a modified word, via suffix prediction, the newly selected word replaces the previously accessed and displayed word for subsequent output to the specialized processor 12 as well as for immediate display. It should be noted that one of ordinary skill in the art could utilize a plurality of separate and distinct temporary memories in place of internal memory 21. However, for the sake of brevity, only one memory is shown. Further, one of ordinary skill in the art could readily realize and adapt the system such that upon immediate display of the accessed words, they are immediately output to a specialized processor 12 and to a subsequent output device. By such a method, any word changed via suffix prediction would merely be output via an audible speaker 18, for example, subsequent to the unchanged originally accessed word.

Accordingly, such a program stored in the EPROM 22, for example, for analyzing and detecting which key(s) have been activated, to determine key location and subsequently analyze and determine which prestored icon symbols, characters, numerals, punctuation, function (including "space", "store", and "end" keys, for example), etc. correspond to the activated key, are well known to those of ordinary skill in the art and thus will not be further explained for the sake of brevity. Similarly, the interfaces between the microcomputer system 6, including microprocessor 20 and RAM 21, and input units, output units, displays, and memories are also well known to those of ordinary skill in the art and thus will not be further explained for the sake of brevity.

Figure 5A:
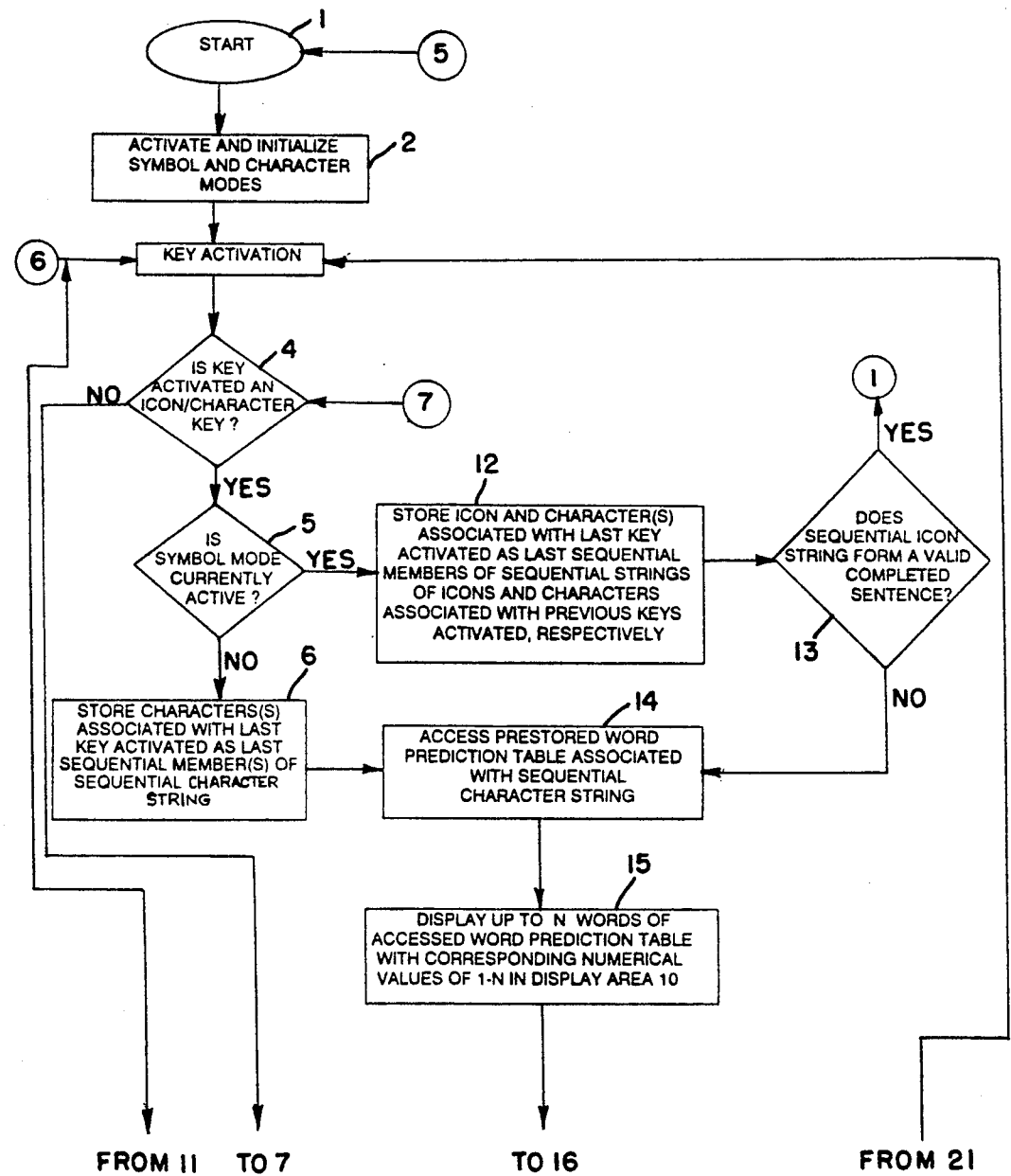
FIG. 5a-5c illustrate a flow chart corresponding to a method of operation of a preferred embodiment of the present invention.
Figure 5B:
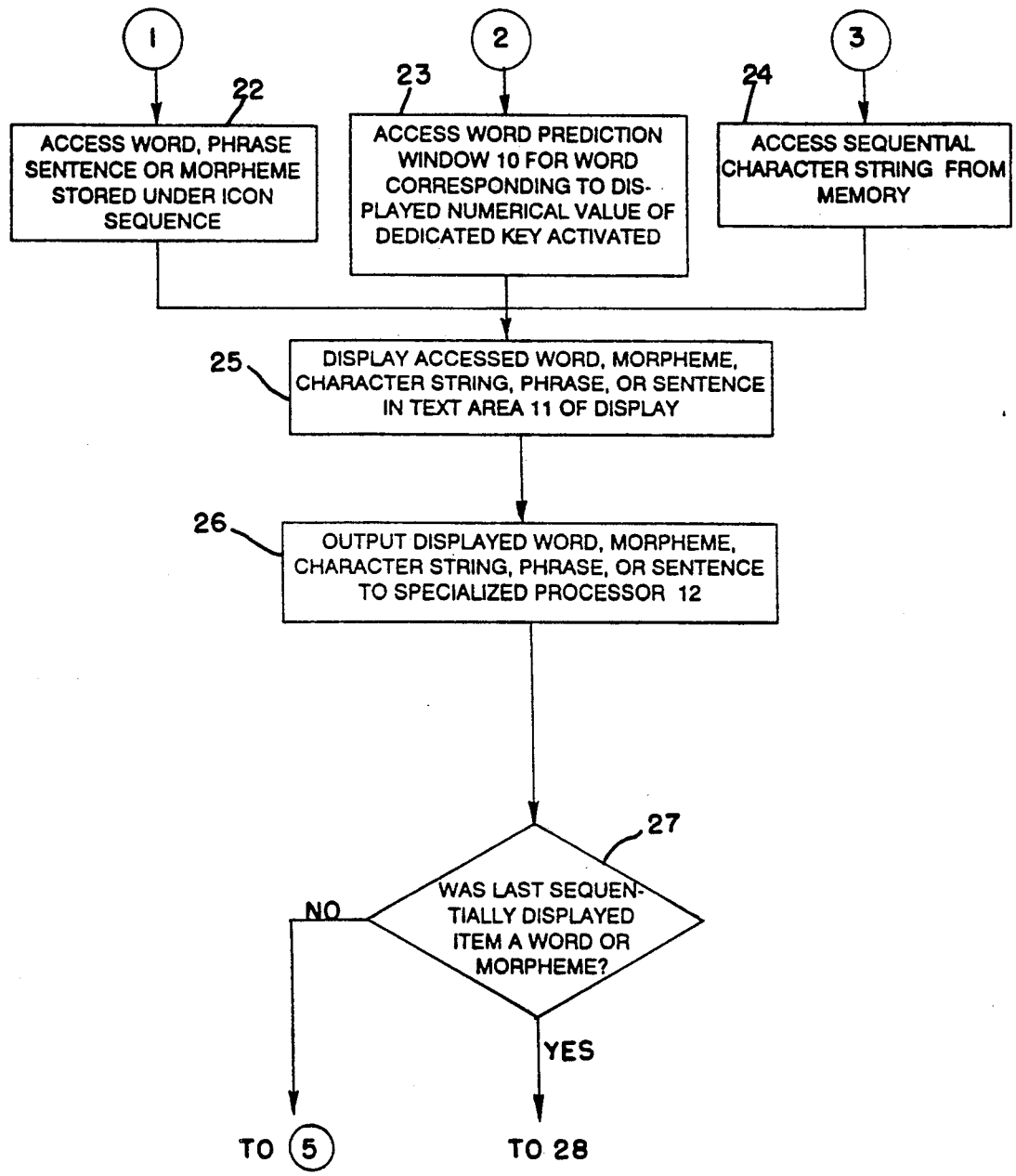

Operation of the system or a preferred embodiment of the present invention will now be described in conjunction with the various flow charts of FIGS. 5a-5c.

Initially, in step 2 of FIG. 5a, upon activating the input system of the present invention, in this preferred embodiment, the input system is placed in the symbol, character, and word and suffix prediction input mode by activating the symbol and character modes (it should be noted that through symbol and character mode activation, word and suffix prediction modes are subsequently accessible).

Subsequently, depending upon the morpheme, word, phrase, or sentence which a user desires to access from memory, an initial key on the keyboard will be depressed in step 3. A detection device within the microprocessor system 6 then detects the location of this first key activated. This key activation is shown in step 3 of FIG. 5a. Then, in step 4, it is determined whether or not the key activated is a key corresponding to an icon, character, or both. If not, the system moves to step 7 to determine if the key activated is the delete selection key; if not, to step 10 to determine if the key activated is a dedicated key; if not, to step 10 to determine if the key activated is a delimiter key; and if not, then whatever function corresponds to the key is performed. (Each of the keys previously mentioned will be described later in detail.) In particular, if the key corresponds to a "clear display" key, for example, the function of display clearance will be entered and the display subsequently cleared. Further, any type of "function" key when activated, will perform its prestored function in a manner known to those of ordinary skill in the art. Subsequently, the system is returned to start at step 11 and a user must begin again, thereby providing continual input. Note that a function performed in step 11 may also include the actions taken in step 2 of activating and initializing symbol and character modes.

If, in step 4, it is determined by the microprocessor or microcomputer system 6, that the key activated corresponds to an icon or character key, or both. Then in step 5, the system determines whether symbol mode is currently active. If so, the icon and character(s), (letter(s) or number(s)) associated with the activated key are temporarily stored (memory 21) in microcomputer system 6, in step 12. If symbol mode is not active, only the character(s) associated with the activated key are temporarily stored in step 6.

Thus, if symbol mode is active, the system then progresses to step 13. In step 13, the microcomputer system 6 then accesses the database of prestored iconic sequences and microprocessor 20 compares the iconic sequence corresponding to stored icons of activated keys (stored in memory 21 of microcomputer system 6) to the plurality of stored icon sequences. If the single icon is detected to match a stored icon sequence (for example, if the user has activated the "knot" icon to access the word "not"), the system moves to step 22 where the morpheme, word, phrase, or sentence corresponding to the icon sequence match is accessed. However, assuming a match of iconic sequences is not obtained (since only a single key, and thus one icon, has been activated and one icon sequences are rare), the system progresses to step 14. If symbol mode is not active, the system progresses directly from step 6 to step 14.

Subsequently, in step 14, the prestored word prediction table in memory 13, 14, 21, and/or 22 is accessed by the microprocessor 20 within microcomputer system 6. The microprocessor 20 compares the character (if this character is a numerical character, no such word prediction takes place) associated with the activated key (stored in memory 21) to the prestored word prediction table. This prestored word prediction table will subsequently be described.

Word prediction dictionaries are well known to those of ordinary skill in the art. Accordingly, a word prediction database can be stored in permanent data storage 14, for example. Thus, if a user were to enter the character "c", the first five to eight words would be displayed beginning with "c", alphabetically in such a system. However, in utilizing such a word prediction dictionary, several thousand common words, easily accessible and preprogrammed so as to correspond to an icon sequence in the present invention, will redundantly appear on a user's display. Therefore, those words already accessible by an icon sequence are redundant and thus it is unnecessary to display the words on a word prediction display. However, a user may take time to master all words, morphemes, phrases and sentences accessible via an icon sequence. Thus, an aid to the user can continually adjust the word prediction dictionary so that the words, phrases, morphemes, and sentences that the user masters so as to sequentially remove the mastered items as redundant items, from word prediction. Note that the word prediction dictionary could be stored primarily in read-only memories 14 or 22, with a corresponding bit map in memory 21 used to determine which items have been removed as word prediction candidates.

As previously mentioned, there were several drawbacks with previously known word prediction systems, such as the cognitive disorientation of a user continuously transferring his eyesight from keyboard to display. Still further, in the area of text generation, useable in the preferred embodiment of the present invention, uncommon words such as "Christopher Columbus" may be desired. Accordingly, in a scholastic environment for text generation, quick and efficient accessibility is desired for such uncommon words. However, with the previously known word prediction dictionary containing both common and uncommon words, a user would probably be better off, on an efficiency basis, to key in the uncommon words letter by letter.

The present invention, in this preferred embodiment, utilizes the advantages of word prediction (accessing a word via a smaller amount of keystrokes than would be necessary on a letter by letter spelling basis), while removing the drawbacks. This is achieved by a user (or a person assisting the user) first entering each of a plurality of morphemes, words, phrases, or sentences and corresponding icon sequences (as will be subsequently described with regard to FIG. 6). The system of the present invention is versatile to suit a user's needs and abilities and allows a user to adapt the system such that icons and icon sequences, readily associable with morphemes, words, phrases, or sentences to a particular user, can be preprogrammed and stored in memory. Further, the icons, being polysemous, can be combined with a plurality of different icons, in different ways, to convey a plurality of different meanings to the user (allowing quick and efficient memory retention of symbol sequence to access stored words, phrases, or sentences) with only a minimum number of keys necessary on the keyboard. The system can further, as is the case in this preferred embodiment, be preprogrammed with a plurality of easily recognizable icon sequences to access ordinary morphemes, words, phrases, or sentences, stored in memory. Once stored, it is these morphemes, words, phrases, or sentences, thus accessible by a user via icon sequences, which can be utilized to remove the disadvantages and capture the advantages of word prediction.

Once all icon sequences have been preprogrammed and stored in memory, with their corresponding words, phrases, or sentences, the microcomputer system 6 (microprocessor 20) the system can then optionally remove all redundant common words and morphemes, from the word prediction dictionary by identifying all duplicated morphemes, words, phrases, and sentences that are both stored under icon sequences and are also found in the word prediction dictionary. Once this comparison is made, a modified word prediction dictionary data base, less all ordinary and easily accessible words via icon sequences, would be stored in memory. This could be achieved by direct copying, or by the bit-map approach described previously. However, the system is further adaptable such that only the words, and morphemes corresponding to icon sequences which have been mastered by a user, as indicated by a user's aid, may be compared to the word prediction dictionary to optionally delete common words.

As a user continues mastery of each of the plurality of icon sequences, in each of a series of teaching sessions for example, these corresponding words and phrases can be separately stored in memory to successively remove words from the word prediction dictionary. Accordingly, as a user learns that a word can be accessed via an icon sequence, it can be removed from the word prediction dictionary. Thus, as words would be accessibly redundant to a user, they are removed. As words are removed from the word prediction aspect of the invention, the word predictor becomes more and more efficient until ultimately, all words accessible via an icon sequence can be removed from word prediction and only words nonaccessible via an icon sequence will appear on word prediction lists (these words preferrably being root words).

Accordingly, upon a user activating a key which is determined to correspond to a character in step 4, and storing it in step 12 or 6, the system will move through steps 14-15 (assuming no icon sequence was determined in step 13) to be subsequently explained, and five to eight uncommon words (preferrably being root words), for example, (uncommon words meaning words not common to both the icon sequence memory and the word prediction dictionary), not already mastered and thus inaccessible via icon sequences, will be displayed in a word prediction mode, corresponding to the character of the activated key. Thus, if it is an uncommon or unmastered (inaccessible via a mastered icon sequence) word or phrase (Christopher Columbus) which the user desires to input, he will know to view the display 7 in area 10 and thus can access the word quickly and efficiently via this modified word prediction (accessing to be subsequently explained). However, if the word, phrase, or sentence desired is ordinary and is known to the user to be accessible via an icon sequence, the user need not view the display (unless desired, since the display will display the icon(s) entered in area 9).

Therefore, by the above mentioned system, one disadvantage of word prediction is removed due to the fact that a user need not continually transfer his viewfield between display and keyboard if an ordinary (icon sequence mastered) word need be accessed. Such an ordinary (mastered) word can be accessed quickly and efficiently through icon sequences as previously discussed herein and thoroughly discussed in Baker '916. However, if it is an uncommon word which is desired, which is frequent in the area of text generation, for example, the user will have the advantage of a modified (subsequently modified to suit a user's progressing abilities) word prediction system which will quickly and efficiently display only uncommon words corresponding to an input character or string of characters, thereby reducing input keystrokes which would be necessary in a normal character spell input mode. Accordingly, by combining a modified word predictor with word accessing and polysemous iconic sequences, a text generator (or speech processor or other forms of output generation) is realized which is quick, efficient, and broad in scope. However, if a user desires a word not already accessible via a mastered polysemous icon sequence or modified word prediction, a normal character spelling mode, running concurrent to the icon and word prediction mode, allows a user the opportunity for input of any and all words.

After the icon and character(s) associated with the last key activated have been stored in a memory 21 within the microcomputer system as the last sequential member(s) of a sequential icon and character string, respectively, associated with previous keys activated in step 12, the system moves to step 13. In step 13, it is determined whether or not the input icons form a valid, completed icon sequence. If not, the system moves to step 14. In step 14, the word prediction table, associated with the sequential string of stored character(s) is accessed from memory. Thus, if a user has depressed the key associated with the character letter "c", for example, all the uncommon words stored in the modified word predictor will be accessed.

Subsequently, upon accessing the words or phrases inaccessible via a mastered icon sequence which begin with "c", for example, up to eight (typically five to eight, for example) of these words will be displayed along with a sequence of numerical indicia 1-8, one number corresponding to each displayed word or phrase, in step 16. Accordingly, words or phrases will be displayed with corresponding numerical values 1-N (N being an integer not exceeding a predetermined value such as 8, for example) in area 10 of display 7. Subsequently, the system moves to step 16. At step 16, if symbol mode is not currently active, the system returns to step 3 to wait for the next key activation. Otherwise, the system moves on to step 17.

At step 17, the system determines whether the sequence of icons thus far entered corresponds to a prefix of a valid prestored icon sequence. This is determined by a simple comparison of the icon sequence thus far entered to the prefix (the first two icons, as there have been two icons thus far entered) of each of the stored icon sequences. Such a comparison can occur concurrent with that of step 13, which is preferrable) using the microcomputer system 6, or separately.

If it is determined that the icons entered thus far do form a prefix, subsequent key activations may yet complete a valid sequence to recall a prestored item from the icon sequence data base, and the system returns to step 3 with symbol mode still active to await the next key activation. If the currently entered icon sequence at step 17 does not form a valid prefix of at least one existing prestored icon sequence, the system proceeds to step 18 where the system confirms that each of the sequentially activated keys is associated with one or more valid characters. If not, the system proceeds to step 20, signalling an error to the system operator, then to step 21, resetting system flags, displays, etc. as necessary, and restoring the system to its state prior to the last key activation. The system then returns to step 3, to await the next key activation.

If in step 18 the system determines that valid characters were associated with each key in the current input sequence, then symbol mode is inactivated in step 19 and any symbols previously displayed in display area 9 are cleared away. However, these symbols are saved in an internal system buffer in case the DELETE SELECTION key (whose operation will be described in detail, later) is subsequently activated. The system then recycles back to step 3 for next key activation. However, upon a next key activated being determined to be a character/icon key in step 4, only the character, not the icon, is stored in memory in step 6. Subsequently, the system essentially bypasses step 13 and word prediction proceeds in step 14.

In step 3, a next key is activated. Subsequently, upon the key activated determined not to be an icon/character key in step 4, the system moves to step 7 (the system and character modes remaining activated assuming this is the second key activated). Subsequently, in step 7, it is determined whether or not the next key activated is the "DELETE SELECTION" key. Operation of the "delete" aspect of the present invention will subsequently be described.

Figure 5C:
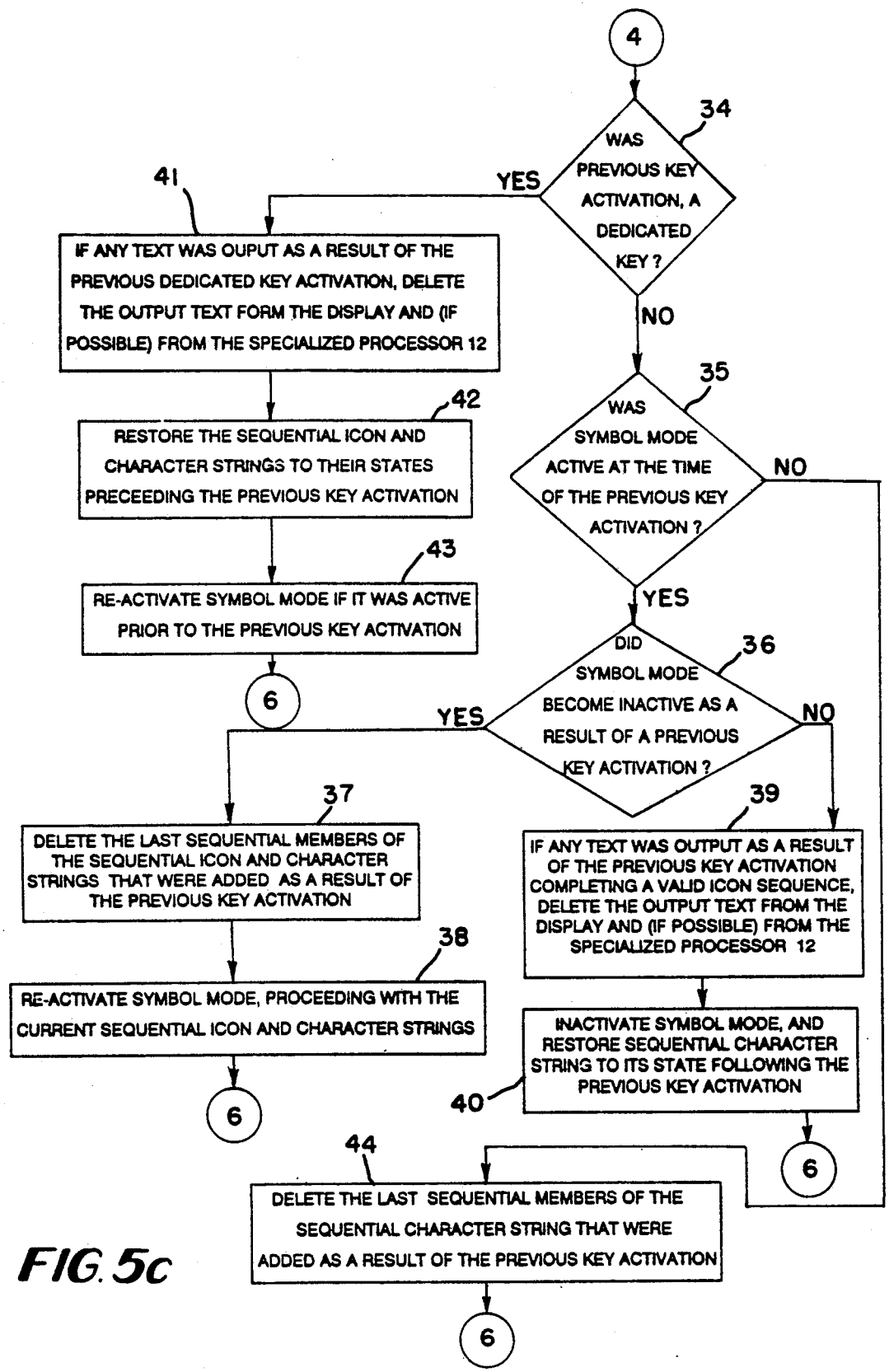

The action of the delete or "DELETE SELETION" key is shown in the flowchart in FIG. 5c. The delete selection key functions so as to "undo" the results of the previous activation of an icon/character key or a dedicated key. The system first determines in step 34 whether the previous key activation was of a dedicated key (in this discussion, the "previous key activation" refers to the most recent key activation that was not the activation of the delete key). If so, and if any text was output to the display 11 or to a specialized processor 12, the system deletes this output text. The sequential icon and character strings, the symbol mode state (active or inactive), and the contents of the word prediction window are restored to their respective states at the time immediately prior to the activation of the dedicated key. All of this information is maintained by the system in various temporary memory buffers (in a manner well known to those of ordinary skill in the art) so that it is available upon activation of the delete key. The system then returns to step 3 to await the next key activation.

If the previous key activation was not a dedicated key, the system proceeds to step 35 and determines whether symbol mode was active at the time of the previous key activation. If not, the system, in step 44, then deletes the last sequential members of the character string that were added as a result of the previous key activation. The system also deletes this key activation from its internal buffers so that a subsequent repeated activation of the delete key will have the effect of deleting the characters that were generated by the key activation prior to the activation whose output characters were deleted by the action of the current delete key operation.

If it is determined in step 35 that symbol mode was active at the time of the previous key activation, the system proceeds to step 36 to determine whether symbol mode then became inactive as a result of the previous key activation. If so, then the system, in step 37, deletes the last sequential members of the icon and character strings that were added as a result of the previous key activation, restoring these strings to their respective states prior to the previous key activation. Symbol mode is then re-activated, in step 38, and the system proceeds to step 3 to await the next key activation.

If it is determined in step 36 that symbol mode did not become inactive as a result of the previous key activation, the system proceeds to step 39. If any text was output to the display 11 or to a specialized processor 12 as a result of the previous key activation completing a valid icon sequence so that the corresponding text was retrieved from the icon sequence data base, the system deletes this output text. The system restores the sequential character string to its state immediately following the previous key activation. Symbol mode is then inactivated, in step 40, and the system proceeds to step 3 to await the next key activation.

As a result of this action of the delete key, represented in FIG. 4 by the "Delete Select" key (however, this is only exemplary and should not be considered in any way limiting because the key could be represented by a pictorial icon, for example), the system operator is able to recover from any key activation error with a single keystroke which will both delete any text unintentionally produced, and return the system to the desired state no matter what automatic mode switching may have transpired as a result of the erroneous key activation. Furthermore, in the case where the system operator has chosen to store a text item under a sequence of icons whose corresponding characters form a possible sequence of letters in spelled English (or whatever language for which the system is implemented) words, the system operator may activate a valid, complete icon sequence when his or her actual intention was to spell a word starting with the corresponding character sequence. Since the system informs the system operator (through a tone or other appropriate feedback channel well known to one of ordinary skill in the art) when a valid icon sequence is recalled, the system operator will realize that an icon sequence has been recalled. By the single activation of the delete key, any text recalled is deleted, and the system correctly interprets the input sequence in character mode, allowing the system operator to finish spelling the desired word (or selecting it from the word prediction window if available).

If, in step 7, it is determined that the "delete" key has not been activated, the system progresses to step 8.

In step 8 it is determined, by microcomputer system 6, whether or not the key activated in step 3 corresponds to a dedicated key with a numerical value. The dedicated key may be one, such as keys 1-8 in the lower right hand corner of FIG. 4. Further, in an alternate embodiment, such as that of an input device utilized for key activation, a dedicated key may be one directly on the display accessible via a mouse. Thus, "dedicated" key is merely utilized to mean a key dedicated to just one function, namely, that of selecting a displayed word.

If the microcomputer system 6 determines the location of the key activated and determines it not to correspond to a dedicated key, such as one with numerical value, 1-8 for example, the system progresses to step 10. At step 10, the microcomputer system 6 determines whether or not the last key activated in step 3 is a delimiter key, such as a comma, period or the "space" (rocket icon) key. This is important because if it is determined that a delimiter key, for example, "space" key, has been activated, the automatic input mode detection device (microprocessor 20) of the system effectively switches out of icon and word prediction modes, and selects the character mode. Thus, the system progresses, to step 24. In step 24, the character string stored in the memory 25 of microcomputer system 6, corresponding to keys activated prior to the delimiter key ("space" key, for example) is accessed. This character string is then output in step 25 to display 7 to be displayed in text area 11. Subsequent steps will be described later in connection with words, morphemes, phrases or sentences accessed via the icon or word prediction modes.

Accordingly, for words of short length or words not accessible via an iconic sequence or word prediction, a user can utilize a delimiter key, such as the "space" key, for output of the character string in an efficient manner.

Further, this "space" key, for example, is normally utilized in text generation, for example, on a typewriter, to separate sequentially generated words. Similarly, a comma or a period also signifies word end and thus sequential word separation. Thus, to a user, the "space" key, and other delimiter keys, already visually signifies word separation in sequential word generation and thus, when a user desires sequential character input, will naturally be utilized by a user to separate a plurality of sequential words. This dual functionality of the delimiter keys, such as the "space" key, further increases system efficiency. Further, if the microcomputer system 6 has not already done so, upon switching out of the iconic and word prediction mode and selecting the character mode, all stored icon symbols will be removed from the memory 21 of the microcomputer system 6 when the system subsequently returns to step 2.

If, however, the next key activated is detected not to be a delimiter key in step 10, the system proceeds via step 11, back to await the next key activation at step 3.

Assuming the second key activated was determined to be an icon/character key in step 4, these are stored in the temporary memory 21, as the next sequential icon (in step 12) and character (in step 12 or 6) in an icon and character string. Thereafter, the system then proceeds from steps 5 and 12 to step 13 where it is now determined if the two-icon sequence stored in the memory 21 of microcomputer system 6 corresponds to one of the icon sequences prestored in memory. If the icon sequence stored in the memory 21 of the microcomputer system 6 does correspond to a valid, completed icon sequence, the automatic selection device (microprocessor 20) remains in and selects the iconic mode, automatically switching out of the character and word prediction modes, and proceeds to step 22. In step 22, the microprocessor 20 of the microcomputer system 6 then accesses, from the icon sequence data base, the morpheme, word, phrase, or sentence corresponding to the icon sequence. Thus, with the iconic mode selected by the automatic mode selection of microprocessor 20, the system of this preferred embodiment of the present invention can access a prestored morpheme, word, phrase, or sentence via an iconic (multi-meaning symbol) sequence with as little as one or two key activations.

Accordingly, thereafter in step 25, the accessed morpheme, word, phrase or sentence stored in the icon sequence data base can be output to display 7 to be displayed in window area 11, in a sequential manner with all previously accessed words. Subsequent steps will be described later in connection with words accessed via a word prediction mode or a character mode.

If, however, an icon sequence is not completed after activation of the first two keys, the system remains in the iconic mode (as long as these first two keys determine a valid prefix of a prestored icon sequence in the data base), along with the modified word prediction, suffix and character modes, and proceeds to step 14 where the character string (now being "ch", corresponding to the "c" and "h" keys being activated, for example) now is utilized by microprocessor 20 to access the modified word prediction dictionary to obtain all of the words corresponding to the character string. Thus, if "ch" is the character string, words and areas such as "Charleston" and "Christopher Columbus" may be accessed from the dictionary, for example. Then, in step 15, up to the first eight words (in alphabetical order) accessed from the dictionary will be displayed, with numerical values 1-N, in display area 10 of display 11. Accordingly, up to this point the icon, character, and modified word prediction modes are all still active.

In step 17, it is then determined whether or not the sequence of icons thus far activated forms a valid prefix to an icon sequence existing in the data base. If so, as in this example, the system returns to step 3 where a next key is activated. Assuming the third key activated was determined to be an icon/character key in step 4, the icon and character corresponding to the last activated key are stored in step 12 as the last sequential member of a sequential string or sequence of icons and characters, respectively, in the memory 21 of microcomputer system 6. Thus, three icon and three character sequences have been stored in memory 21.

In step 13, it is again determined whether or not the icon sequence (now three sequential icons) stored in the memory 21 of microcomputer system 6 corresponds with a prestored icon sequence in the data base as previously described. If it does correspond to a prestored icon sequence, the morpheme, word, phrase, or sentence corresponding to the icon sequence is accessed in step 22. If, however, the keys activated do not form one of the prestored icon sequences, the system again proceeds to step 14.

The system then proceeds to step 14 wherein the three character string stored in memory 21 is utilized, by the microcomputer 6, in accessing a plurality of words or phrases from the modified word prediction dictionary, corresponding to the three character string. A list of up to eight corresponding words are then displayed in step 15, alphabetically, with corresponding numerical values, in display area 10. Subsequently, the system proceeds to step 16 to determine whether or not the symbol mode is still active and if so, proceeds to step 17.

In step 17, the microcomputer system 6 again checks whether the sequence of icons thus far activated forms a valid prefix to an existing prestored icon sequence. If it does not, the system verifies in step 18 that valid characters were associated with each key activated in the currently stored sequence. If so, the system progresses to step 19. In step 19, the icon mode is effectively switched off, and all previously stored icons are removed from display area 9 of the display 7. Thereafter, the automatic mode selection device (microprocessor 20) maintains only the stored character string and effectively maintains, for subsequent selection, only the character and word prediction modes (with also the possibility of returning to the symbol mode). The system subsequently progresses back to step 3 where a fourth key is activated.

After activation of the fourth (next) key, the system proceeds to step 4; and if the determination is no, to step 7. At step 7, it is again determined whether or not the next key activated is the "delete" key. If not, the system proceeds to step 8. At step 8, it is again determined whether or not the last key activated in step 3 corresponds to a dedicated key. If the answer is yes, the system proceeds to step 9. However, this only applies to "dedicated" keys, for example, those with a numerical value, such as keys 1-8 in the lower right-hand corner of FIG. 4. This is because dedicated keys, only, must be used for accessing the words or phrases displayed in the word prediction table (or suffix table to be subsequently described). If a user could access the prediction table via keys with icons and numerical values on them, the user may accidentally access a word or phrase via the modified word prediction mode when desiring only to input another icon in forming an icon sequence. Thus, by dedicating keys solely for word prediction (or suffix generation to be subsequently explained) access, such mistakes are avoided.

It should further be noted that access of one of the plurality of displayed words can also be achieved by utilizing a "mouse". Use of a mouse, as an alternate input device is well known to those in the computer arts and thus could easily be implemented by one of ordinary skill in the art for dedicated selection of a displayed word. Thus, the present invention should be understood to include such an input device.

In step 9, it is determined whether or not the dedicated key activated is one corresponding to a displayed word or phrase in the word prediction table of display area 10. If the dedicated key is not found to correspond, by the microcomputer system 6, to a displayed word or phrase in the word prediction table (namely a dedicated key with numerical value "8" is depressed when only 6 words, 1-6, are displayed in area 10, for example), then an error is signaled in step 20, the system (including memory 21) is restored to its state prior to the last key activation in step 21, and then returns to step 3 to await the next key activation.

However, if in step 9, the dedicated key with a number is determined, by microcomputer system 6, to be a dedicated key corresponding to a displayed word in the word prediction table in area 10 of display 7, the automatic input mode selection device (microprocessor 20) of the system selects the word prediction mode, essentially switching out of icon and character modes, and Proceeding to step 23. In step 23, the prestored word corresponding to the dedicated key activated is accessed from the word prediction dictionary by microcomputer system 6. This word, accessible via word prediction is then displayed on display 7 in area 11 as an accessed word in step 25 (in a similar manner as if accessed via the icon or character mode).

The displayed phrase, morpheme, word or sentence is then output to a specialized processor 12 in step 26. Further, in the text generation system of the preferred embodiment of the present invention, the phrase or sentence may be subsequently output to a printer 16 to generate continuous text.

Thereafter, in step 27, the microcomputer system 6, whether the word, morpheme, phrase or sentence has been accessed and displayed via the word prediction mode, symbol mode, or the icon mode, then determines whether the accessed and displayed item is a word or a morpheme. If not, after step 27, the system then returns to start, awaiting further key activations while effectively switching back to the icon, character and word prediction mode, removing the character and icon strings from memory 21. However, upon the microcomputer system 6 determining that the accessed and displayed item is a word or morpheme, the system moves to step 28 and thus may enter the suffix prediction mode.

Suffix prediction occurs in a manner somewhat similar to that previously described with regard to word prediction. In the word prediction dictionary, an exhaustive list of all possible suffixes is stored. Using a suffix list, prestored along with each word or morpheme, whether the word or morpheme was accessed via the icon, the word prediction, or the character modes, all possible suffixes which can legitimately be appended to the accessed word are accessed from the dictionary in step 28.

Upon determining those suffixes which can legitimately be appended to the word or morpheme, the system moves to step 29. At step 29, the word or morpheme is then displayed in display area 10 with eligible suffixes appended and with corresponding numerical values from 1-N (N being an integer). Thus, the word or morpheme is displayed with up to eight eligible suffixes, for example, (eight is chosen for exemplary purposes and should thus not be considered limiting. However, through experimentation, it has been determined that most words or morphemes will not contain more than 8 suffixes).

Subsequently, in step 30, a next key is activated. Then, in step 31, it is determined whether or not the next key activated is a dedicated key corresponding to a word displayed (1-N) in the suffix table in area 10. If the key activated is not a dedicated key corresponding to a word displayed in the suffix table of area 10, the system activates and initializes both symbol and character modes, in step 45, (as in step 2), and proceeds back to step 4 to determine if the activated key is an icon/character key corresponding to a next word, phrase or morpheme or sentence desired to be accessed by a user, the previous word or morpheme being output to a specialized processor 12 in step 26. Subsequently, the previous word or morpheme can be output to a printer 16 for continuous text generation, the system thereafter determining next input. Upon the output of the word or morpheme to a specialized processor 12 and/or printer 16, the system then returns to step 4 where it is determined whether or not the activated key is an icon or character key, as previously stated, thereby allowing a user to maintain a word as originally accessed, thereby not utilizing any suffix prediction mode. This adds to a user's efficiency in that, if a suffix is desired, the user can select a different form of the word from display 20. However, if the form of the word is desirable for the user, the user can then hit a next key, the previous word, morpheme, sentence, or phrase already output, for next word, phrase, morpheme or sentence access, thereby essentially ignoring the suffixes.

If, in step 31, however, it is determined that the next key activated is a dedicated key corresponding to one of the words displayed in the suffix table of area 10, the system moves to step 32. At step 32, the input mode automatic selection device (microprocessor 20) then selects the suffix mode. This suffix mode is an additional mode which can be selected in addition to each of the already selected character, icon or word prediction mode. With the suffix mode selected, the word in the suffix table corresponding to the activated dedicated key is accessed in step 32. This word, accessed in step 32 is then used to replace the previously accessed word or morpheme in step 33. This newly accessed word is then displayed, in display area 11 of display 7. The newly accessed word is further output to the specialized processor 12 for subsequent output to printer 16 (for example, in text generation), in replacement of the previous word or morpheme, now deleted, and subsequently returned to start at step 1.

Accordingly, in such a system, continual input of characters, word prediction information, or icon sequences are possible, along with subsequent suffix predictions. Thus, stored words, morphemes, phrases, or sentences can be accessed via a minimal number of key activations. The system capitalizes on the polysemous nature of symbols described in Baker '916; only utilizes the positive attributes of word prediction via a continuously modified type of word prediction; and still allows production of new words, phrases, or sentences previously not already accessible based on what was prestored, and subsequently mastered in the system; all occurring without manual activation of mode selection keys thereby further minimizing necessary key input strokes. Such a system, in an environment of the mentally and physically impaired, can mean enormous physical savings as well as minimizing levels of user frustration. The system is further readily adaptable to suit any user's needs, allowing creation of new symbol sequences to correspond to desired words, phrases, or sentences.

Further, as previously described, the various symbols, shown on the keyboard of FIG. 4 should not be considered in any way to be limiting. The system is, in a preferred embodiment, preprogrammed, via internal memory 22, such that the microcomputer system 6 recognizes and understands each of the various icons on the keys. However, such a system can be reprogrammed for any number of different symbols to allow a user an enormous number of adaptable symbol sequences. The keyboard of FIG. 4 is merely given for exemplary purposes and thus should not be considered in any way to be limiting.

By providing a system recognizing and adaptively automatically selecting and switching in and out of icon, character, and modified word prediction modes, and, optionally, a subsequent suffix prediction mode, an efficient input system is realized for accessing and outputting desired words, phrases, or sentences. Further, the system provides continuous operation. Thus, upon accessing a morpheme, word, phrase, or sentence via an icon sequence, the user can just hit a next key for next word access via icon or character sequence, or word prediction or can elect to utilize the suffix prediction mode to access an alternate form of the morpheme or word. No start or stop key is necessary. Each mode is automatically selected to require only the minimum number of key activation necessary to a user and further icon, character, word prediction and suffix prediction modes may be successively used to successively access and output words without interruption. Such an input system for user communication in the areas of text or speech generation is essential and thus invaluable. A user can thus write a continuous paper or carry on a normal conversation with such a unit, with minimum key activations.

Also, by utilizing a delimiter key for signaling output of characters in a character string forming a word, continuous input of a next word is possible. This is because the delimiter key performs the dual purpose of separating sequential words (by outputting a space, for example) in text generation, for example, while also serving to initiate character string output, signaling selection of the character or spelling mode (the character string is output prior to the symbol corresponding to the delimiter including a blank space, being output). Thus, a key which visually signals word separation in a word sequence and must normally be used to separate sequentially entered words via alphabetic characters, serves such a dual purpose. It should be further noted that in morpheme, word, phrase, or sentence accessed via an icon sequence or word prediction or subsequent suffix prediction, especially utilizing the present invention for text generation, proper spacing between words has already been preprogrammed with the stored words, into the microcomputer system 6, and thus occurs upon word output.

Still further, the device of the present invention is adaptable. In one preferred embodiment, as shown through FIGS. 4-6, it is a single dedicated unit. However, a microprocessor of a laptop computer can be similarly programmed, utilizing existing memory (or adding increased memory depending on capabilities), and merely utilizing a keyboard icon/character overlay to perform the functions of the present invention. Accordingly, the system of the present invention should not be in any way considered limited to a dedicated device. Further, similar to that of a laptop computer, the present invention could be readily adapted, by one of ordinary skill in the art, to a desktop computer.

Figure 6:
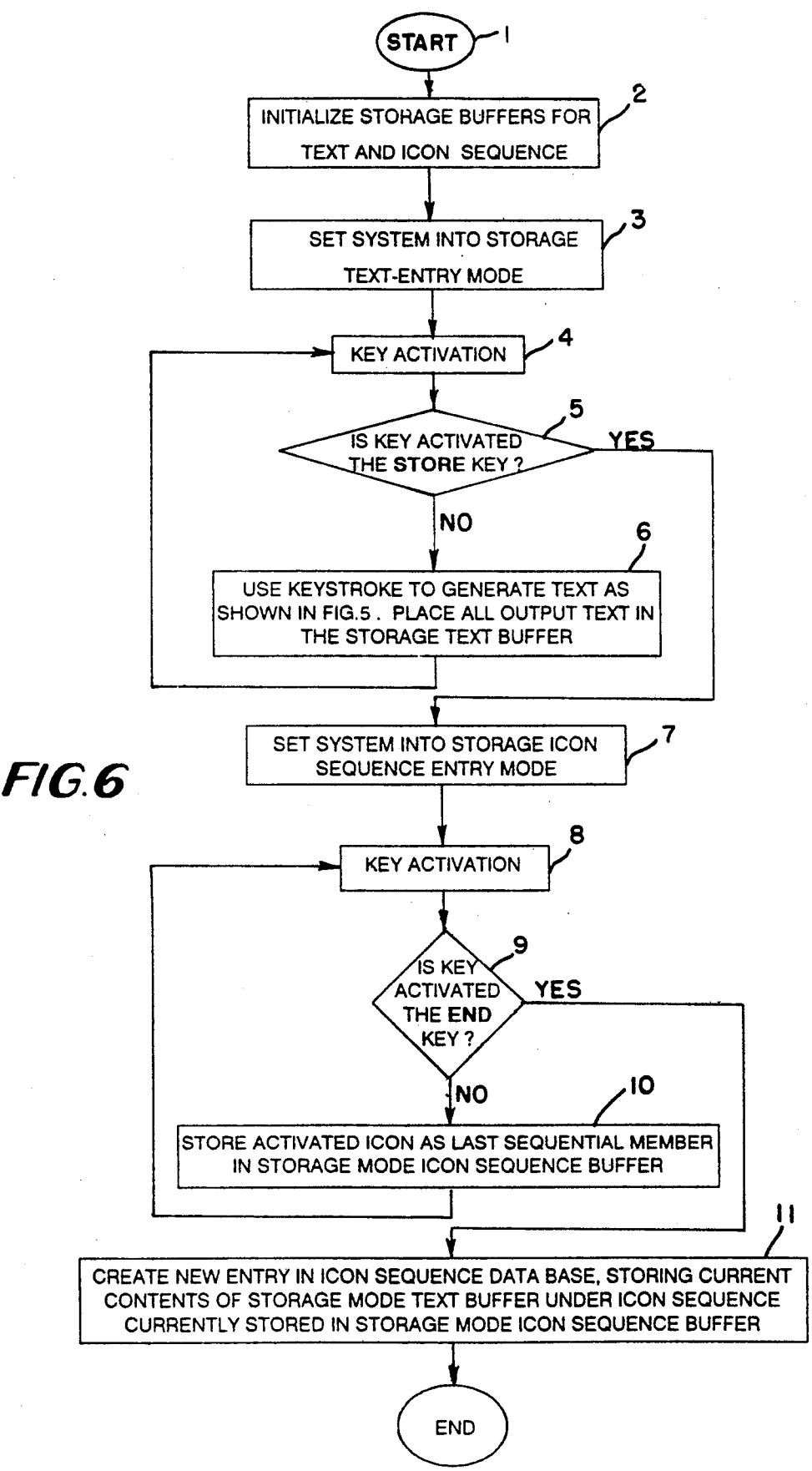
FIG. 6 illustrates a flow chart corresponding to symbol preprogramming in a preferred embodiment; and The above-mentioned drawings will be described in detail in the following detailed description.

The programming steps with regard to initially programming a sequence of icons so as to correspond to a morpheme, word, phrase, or sentence, and the storing of that morpheme, word, phrase, or sentence so that it can be accessed by the system as previously described with regard to FIG. 5, will subsequently be described with regard to FIG. 6 of the present invention. Initially, the system is started. Then a key is activated on the keyboard. This occurs in step 3 after step 2 of FIG. 5, and subsequent to the initial start step. In step 4 of FIG. 5, it is determined whether or not the key activated is an icon/character key. If not, the system progresses to step 7. If the key activated is neither the delete key, nor a dedicated key, nor a delimiter key, the system will proceed to step 11 to perform the functions designated by the key. If the microprocessor 20 detects that it is the "store" key which has been depressed, the system is then in the programming mode which will subsequently be discussed in FIG. 6. The method shown in FIG. 6 is only exemplary, as other methods could easily be implemented to achieve the same ends.

The storage mode is initialized in step 2, and the system is prepared for storage mode text-entry in step 3. After each key activation in step 4, the system determines in step 5 whether this is another activation of the "Store" key, and if so, proceeds to step 7 since the Store key is used to designate both initiation and termination of the storage text-entry mode. If it is not the Store key, the keystroke is interpreted and analyzed as per FIG. 5, but with any text output produced being piped into the storage mode text buffer.

Upon activation of the Store key, the system proceeds to step 7 and sets the system into the storage icon sequence entry mode. After each subsequent key activation, if the key corresponds to an icon, that icon is stored as the last sequential member of the storage mode icon sequence buffer. If it is a function (other than the END function) that is relevant to the icon sequence entry process (such as the Delete Icon function), that function may also be performed. If the key activated corresponds to the END function as determined in step 9, the system proceeds to step 11, where the current contents of the storage mode text buffer are stored in the icon sequence data base under the icon sequence entered and saved in the storage mode icon sequence buffer. The system then exits from storage mode, activates and initializes both the symbol and character modes (in step 12 of FIG. 6), and resumes operation starting at step 3 of FIG. 5, having completed the performance of the "Store" function as per step 11 of FIG. 5. An example of a two icon storage and a corresponding stored word will be subsequently described.

The programming aspect of the present invention is very easy for a user to access. Further, the system is designed such that, if the system is being utilized for a person with lower mental or physical capabilities, a person with higher mental and physical capabilities may program the system as the person, with the lower mental and/or physical disabilities, desires.

For example, the person who is to use the system, can select, or have an assistant select, his own symbols or icons to correspond to each particular morpheme, word, phrase or sentence. Upon the person visually and mentally selecting the symbols, a person of higher intellect may then select the store key as detected in step 11 of FIG. 5. The system then moves to FIG. 6. The person inputting the information then need only input the keys to generate the sentence "What time is it?" and then activate the "store" key. Icon or symbol keys are then selected corresponding to, for example, the question mark and the picture of Father Time, as shown on the keyboard of FIG. 4 (the symbols correspond to the keys with the capital letter "Q" and capital letter "T" on them as shown in FIG. 4). The person inputting the symbols then merely selects the "end" key. Accordingly, the programming with regard to the present invention can easily be achieved to suit the needs of the person utilizing the input system of the present invention. Therefore, symbols which the user of the present invention can easily recognize and therefore, can easily remember, can be utilized to access a morpheme, word, phrase, or sentence, which can be subject to suffix prediction and can then or alternately, be output to, for example, a text generation or speech synthesis system to be further output as a printed message or an audible message through a speaker. Thus, excellent communication through the use of the present invention can be achieved.

Still further, as previously described, the system of the present invention can, and will be in a preferred embodiment, prestored with a plurality of icon sequences and corresponding morpheme, word, phrases or sentences (with proper spaces and other delimiter symbols) so that a user need only input certain specific icon sequences for desired morphemes, words, phrases, and sentences. However, if desired, the user can input each and every icon symbol sequence and corresponding morpheme, word, phrase, or sentence. This is because, in one preferred embodiment, the system will continually store new icon sequences in the icon sequence database with morphemes, words, phrases, or sentences. Only new sequences can be stored, however, due to the output error which would occur if the same sequence was stored with a different morpheme, word, phrase, or sentence. Thus, prior to storing the corresponding morpheme, word, phrase, or sentence with an icon sequence, the microcomputer system 6 compares the icon sequence with all previously stored icon sequences. If the icon sequence is found to previously exist, then the new corresponding morpheme, word, phrase, or sentence is stored in place of the previous morpheme, word, phrase, or sentence, with the old icon sequence. The system is not limited in number of icons in a sequence and one of ordinary skill in the art would thus easily be able to expand the system of the present invention to encompass icon sequences of four or more icons. Thus, the present invention is not deemed to be limited in any way to icon sequences of two or three icons, such icon sequences being described for illustrative purposes only.

From the above-described embodiments of the present invention, it is apparent that the present invention may be modified as would occur to one of ordinary skill in the art without departing from the scope of the present invention which should be defined solely by the appended claims. Changes and modifications of the system contemplated by the present preferred embodiments will be apparent to one of ordinary skill in the art.

We claim:

1. A continuous input device for use in a sequential word generation system, the continuous input device providing input of a plurality of polysemous symbols, in selected sequences, to access prestored words and concurrently providing input of a plurality of alphabetic characters, in selected sequences, corresponding to non-prestored words, without the need of a mode selection key utilizable solely for selection among a plurality of input modes, the device comprising:

key input means, including a plurality of keys corresponding to both polysemous symbols and alphabetic characters, for, upon key activation, inputting corresponding polysemous symbols and alphabetic characters;

storage means, operatively connected to said key input means, for sequentially storing input polysemous symbols as a symbol sequence and for separately and concurrently sequentially storing input alphabetic characters as a character string;

comparison means, operatively connected to said storage means, for comparing said stored symbol sequence, upon storage of each polysemous symbol in the stored symbol sequence, to a plurality of predetermined symbol sequences to determine a symbol sequence match; and input mode automatic selection means, operatively connected to said storage means, comparison means, and key input means, for automatically selecting a symbol mode and utilizing said stored input symbol sequence to subsequently access stored information for subsequent output upon said comparison means determining a symbol sequence match and for automatically selecting a character mode and utilizing said stored input character string upon the input symbol sequence being of a predetermined length and upon said comparison means not determining a symbol sequence match.

2. The device of claim 1, wherein said input mode automatic selection means, upon said comparison means determining a symbol sequence match, deletes said sequentially stored character string from said storage means.

3. The device of claim 1, further comprising:
   first memory means, operatively connected to said comparison means, for storing a plurality of polysemous symbol sequences and at least one word corresponding to each polysemous symbol sequence as stored information for access and subsequent output.

4. The device of claim 3, wherein said accessed stored information is output to a printer.

5. The device of claim 3, further comprising:
   key detection means, operatively connected to said key input means, for detecting activation of one of a plurality of predetermined keys not solely utilizable for selection among a plurality of input modes, among said plurality of key input means keys; and wherein said input mode automatic selection means automatically selects a character mode and accesses said sequentially stored character string for subsequent output upon said key detecting means detecting activation of one of said plurality of predetermined keys.

6. The device of claim 5, wherein each one of said plurality of predetermined keys are delimiter keys, visually signifying word separation in sequential word generation.

7. The device of claim 5, wherein said comparison means, operatively connected to said storage means further continually compares said stored character string, upon storing of each sequential character in the character string, to a plurality of prestored words to continually generate a plurality of selectable words, each containing said stored character string, for selectable output.

8. The system of claim 7, further comprising:
   second memory means, operatively connected to said comparison means, for storing said plurality of prestored words, each including and corresponding to a sequential string of the plurality of alphabetic characters.

9. The device of claim 8, further comprising:
   display means, operatively connected to said second memory means and said comparison means, for continuously displaying said plurality of selectable words, containing said stored character string, continuously generated by said comparison means.

10. The device of claim 9, wherein said display means displays said plurality of selectable words with corresponding sequential numerical values.

11. The device of claim 10, wherein said key input means further comprises plural dedicated display selection means, each corresponding to a displayable numerical value, each for, upon activation, selecting and accessing a displayed word of corresponding numerical value.

12. The device of claim 11, wherein said plural dedicated display selection means comprises a plurality of dedicated keys, each with a numerical value corresponding to a displayable numerical value.

13. The device of claim 12, wherein said key detection means further detects activation of said plurality of dedicated display selection keys and, upon said key detection means detecting activation of one of said dedicated display selection keys with a numerical value corresponding to a display numerical value, said input mode automatic selection means, operatively connected to said display means, automatically selects a third mode and accesses said selected word corresponding to said numerical value of said activated dedicated display selection key for subsequent output.

14. The device of claim 13, wherein said first memory means stores words exclusive of the second memory means and the second memory means stores words exclusive of the first memory means.

15. The device of claim 14, wherein each of said plurality of words stored in said second memory means are words which include and correspond to a sequential string of alphabetic characters.

16. The device of claim 15, wherein said comparison means, operatively connected to said input mode automatic selection means, compares said accessed word, accessed by said input mode automatic selection means, to each of a plurality of prestored suffixes to generate a plurality of selectable words, each containing said accessed word, for selectable access and subsequent output.

17. The device of claim 16, further comprising:
third memory means, operatively connected to said comparison means, for storing said plurality of prestored suffixes, each corresponding to at least one of said stored character strings.

18. The device of claim 17, wherein said display means, operatively connected to said second and third memory means and said comparison means, displays said plurality of selectable words generated by said comparison means with corresponding sequential numerical values.

19. The device of claim 18, wherein, upon said key detection means detecting activation of one of said dedicated display selection keys corresponding to a displayed numerical value, said selected word corresponding to said numerical value of said activated dedicated display selection key is accessed for subsequent output.

20. The device of claim 3, wherein said comparison means further compares the stored symbol sequence, upon storage of each polysemous symbol in the stored symbol sequence, to the plurality of predetermined symbol sequences to determine if the stored symbol sequence is a prefix of at least one of said predetermined symbol sequences; and
said input mode automatic selection means automatically selects said character mode upon said comparison means determining that the stored symbol sequence is not a prefix of at least one of said predetermined symbol sequences and said stored character string is a string of valid characters.

21. The device of claim 20, wherein upon said input mode automatic selecting means selecting said character mode, said stored character string is output to a printer.

22. A continuous input and word generation system, for providing input of a plurality of polysemous symbols, in selected sequences, to access prestored words and currently providing input of a plurality of alphabetic characters, in selected sequences, corresponding to a non-prestored words, without the need of a mode selection key utilizable solely for selection among a plurality of input modes, the system comprising:
key input means, including a plurality of keys corresponding to both polysemous symbols and alphabetic characters, for, upon key activation, inputting corresponding polysemous symbols and alphabetic characters;
storage means, operatively connected to said key input means, for sequentially storing input polysemous symbols as a symbol sequence and for separately and concurrently sequentially storing input alphabetic characters as a character string;
comparison means, operatively connected to said storage means, for comparing said stored symbol sequence, upon storing of each polysemous symbol in the stored symbol sequence, to a plurality of predetermined symbol sequences to determine a symbol sequence match;
key detection means, operatively connected to said key input means, for detecting activation of one of a plurality of predetermined keys among said plurality of key input means keys, said plurality of predetermined keys not soley utilizable for selection among a plurality of input modes; and
input mode automatic selection means, operatively connected to said storage means, comparison means, and key detection means, for automatically selecting a first mode and utilizing said stored input symbol sequence to access stored information upon said comparison means determining a symbol sequence match, and for automatically selecting a second mode and accessing said sequentially stored character string upon said key detection means detecting activation of one of said plurality of predetermined keys; and
output means, operatively connected to said storage means, for receiving and outputting said stored accessed information corresponding to said input polysemous symbol sequence, upon said input mode automatic selection means selecting said first mode, and for receiving and outputting said accessed character string from said storage means upon said input mode automatic selection means selecting said second mode.

23. The system of claim 22, further comprising:
first memory means, operatively connected to said comparison means and said output means, for storing a plurality of polysemous symbol sequences and at least one word, corresponding to each polysemous symbol sequence, as stored information for subsequent output to said output means.

24. The system of claim 23, wherein said first memory means stores polysemous symbol sequences comprising at least one polysemous symbol.

25. The system of claim 23, wherein said comparison means, operatively connected to said storage means, further continually compares said stored character string, upon storing of each sequential character in the character string, to a plurality of prestored words to continually generate a plurality of selectable words, each including said stored character string, for selectable output to said output means.

26. The system of claim 25 further comprising:
second memory means, operatively connected to said comparison means, for storing said plurality of prestored words, each including and corresponding to a sequential string of the plurality of alphabetic characters.

27. The system of claim 26, further comprising:
display means, operatively connected to said second memory means and said comparison means, for continuously displaying said plurality of selectable words, containing said stored character string, continuously generated by said comparison means.

28. The system of claim 27, wherein said display means displays said plurality of selectable words, each with corresponding sequential numerical values.

29. The system of claim 28, wherein said key input means further comprises plural dedicated display selection means, each corresponding to a displayable numerical value, each for, upon activation, selecting and accessing a displayed word of corresponding numerical value.

30. The system of claim 29, wherein said plural dedicated display selection means comprises a plurality of dedicated keys, each with a numerical value corresponding to a displayable numerical value.

31. The system of claim 30, wherein said key detection means further detects activation of said plurality of dedicated display selection keys and, upon said key detection means detecting activation of one of said dedicated display selection keys with a numerical value corresponding to a displayed numerical value, said input mode automatic selection means, operatively connected to said display means, automatically selects a third mode and accesses said selected word corresponding to said numerical value of said activated dedicated display selection key for subsequent output.

32. The system of claim 31, wherein said first memory means stores words exclusive of the second memory means and the second memory means stores words exclusive of the first memory means.

33. The system of claim 32, wherein said comparison means, operatively connected to said input mode automatic selection means, compares said accessed word, accessed by said input mode automatic selection means, to each of a plurality of prestored suffixes to generate a plurality of selectable words, each containing said accessed word, for subsequent output.

34. The system of claim 33, further comprising:
third memory means, operatively connected to said comparison means, for storing said plurality of prestored suffixes, each corresponding to at least one of said stored words.

35. The system of claim 34, wherein said display means, operatively connected to said second and third memory means and said comparison means, displays said plurality of selectable words generated by said comparison means with corresponding sequential numerical values.

36. The system of claim 35, wherein, upon said key detection means detecting activation of one of said dedicated display selection keys corresponding to a displayed numerical value, said selected word corresponding to said numerical value of said activated dedicated display selection key is output to said output means.

37. The system of claim 22, wherein said output means is a printer for providing continuous word generation.

38. The system of claim 37, wherein said comparison means further compares the stored symbol sequence, upon storage of each polysemous symbol in the symbol sequence, to the plurality of predetermined symbol sequences to determine if the stored symbol sequence is a prefix of at least one of said predetermined symbol sequences; and
said input mode automatic selection means automatically selects said second mode upon said comparison means determining that the stored symbol sequence is not a prefix of at least one of said predetermined symbol sequences and said stored character string is a string of valid characters.

39. The system of claim 38 wherein, upon said input mode automatic selecting means selecting said second mode, said stored character string is output to said printer upon said key detection means detecting activation of one of said plurality of predetermined keys.

40. The system of claim 22, wherein one of said plurality of predetermined keys is the space key, visually signifying word separation in sequential word generation.

41. A continuous input device for use in a sequential word generation system, the continuous input device providing input of a plurality of polysemous symbols, in selected sequences, to access corresponding prestored words in a symbol mode and concurrently providing input of a plurality of alphabetic characters, in selected sequences, corresponding to words inaccessible via polysemous symbol sequences, in a character mode, without the need of a mode selection key utilizable solely for selection between the symbol and character modes, the device comprising:

key input means, including a plurality of keys corresponding to both polysemous symbols and alphabetic characters, for, upon key activation, inputting corresponding polysemous symbols and alphabetic characters;

storage means, operatively connected to said key input means, for sequentially storing input polysemous symbols as a symbol sequence and for separately and concurrently sequentially storing input alphabetic characters as a character string;

comparison means, operatively connected to said storage means, for comparing said stored symbol sequence, upon storage of each polysemous symbol in the stored symbol sequence, to a plurality of predetermined symbol sequences to determine a symbol sequence match;

said comparison means further comparing the stored symbol sequence, upon storage of each polysemous symbol in the symbol sequence, to the plurality of predetermined symbol sequences to determine if the stored symbol sequence is a prefix of at least one of said predetermined symbol sequences;

input mode automatic selection means, operatively connected to said storage means and comparison means, for automatically selecting the symbol mode upon said comparison means determining a symbol sequence match, and for automatically selecting the character mode upon said comparison means determining that the stored symbol sequence is not a prefix of at least one of said predetermined symbol sequences and said stored character string being a string of valid characters.

42. The device of claim 41, wherein said input mode automatic selection means, upon said comparison means determining a symbol sequence match, deletes said sequentially stored character string from said storage means.

43. The device of claim 41, further comprising:
first memory means, operatively connected to said comparison means, for storing a plurality of polysemous symbol sequences and at least one word, corresponding to each polysemous symbol sequence.

44. The device of claim 43, wherein, upon said input mode automatic selection means selecting the symbol mode, said at least one word corresponding to said stored input symbol sequence is accessed from said first memory means for subsequent output.

45. The device of claim 44, wherein, upon subsequent output of said at least one word, said input device is placed in a neutral state restoring all input modes, again awaiting selection among a plurality of input modes.

46. The device of claim 43, further comprising:
key detection means, operative connected to said key input means and said input mode automatic selection means, for detecting activation of one of a plurality of predetermined keys, visually signifying word separation in sequential word generation, among said plurality of key input means keys.

47. The device of claim 46, wherein,
upon said input mode automatic selection means selecting said character mode and said key detection means detecting subsequent activation of one of said plurality of predetermined keys, said stored character input string is accessed for subsequent output.

48. The device of claim 47, wherein said comparison means, operatively connected to said storage means, further continually compares said stored character string, upon storing of each sequential character in the character string, to a plurality of prestored words to continually generate a plurality of selectable words, each including said stored character string, for selectable subsequent output.

49. The device of claim 48, further comprising:
second memory means, operatively connected to said comparison means, for storing said plurality of prestored words, each including and corresponding to a sequential string of the plurality of alphabetic characters.

50. The device of claim 49, further comprising:
display means, operatively connected to said second memory means and said comparison means, for continuously displaying said plurality of selectable words, containing said stored character string, continuously generated by said comparison means, each with corresponding sequential numerical values.

51. The device of claim 50, wherein said key input means further includes plural dedicated display selection means, each corresponding to a displayable numerical value, each for, upon activation, selecting and accessing a displayed word of corresponding numerical value.

52. The device of claim 51, wherein said plural dedicated display selection means comprises a plurality of dedicated keys, each with a numerical value corresponding to a displayable numerical value.

53. The device of claim 52, wherein said key detection means further detects activation of said plurality of dedicated display selection keys and, upon said key detection means detecting activation of one of said dedicated display selection keys with a numerical value corresponding to a displayed numerical value, said input mode automatic selection means, operatively connected to said display means, automatically selects said character mode.

54. The device of claim 53, wherein, upon said input mode automatic selection means selecting said character mode via said key detection means detecting activation of one of said dedicated display selection keys, said selected word corresponding to said numerical value of said activated dedicated display selection key is accessed for subsequent output.

55. A method of automatic input mode selection in an input device, utilizable in a plurality of input modes and including a plurality of keys corresponding to both polysemous symbols and alphabetic characters, the automatic input mode selection occurring without the need of a mode selection key utilizable solely for selection among a plurality of input modes, comprising the steps of:
a) inputting polysemous symbols and alphabetic characters, corresponding to a plurality of input keys, upon sequential key activation;
b) storing input polysemous symbols, sequentially input, as a symbol sequence;
c) storing input alphabetic characters, sequentially input, as a character string;
d) prestoring a plurality of predetermined polysemous symbol sequences and at least one word corresponding to each predetermined polysemous symbol sequence;
e) comparing the stored symbol sequence, upon storage of each sequentially input polysemous symbol, to each of the plurality of predetermined stored polysemous symbol sequences to determine a symbol sequence match;
f) selecting a symbol input mode for the input device, automatically, upon determining a symbol sequence match in the comparison of step (e);
g) accessing the prestored at least one word, corresponding to the input symbol sequence, upon the symbol input mode being selected in step (f); and
h) selecting a character mode for the input device, automatically, upon the input symbol sequence being of a predetermined length and upon not determining a symbol sequence match in the comparison of step (e).

56. The method of claim 55, further comprising the step of:
i) outputting the accessed at least one word upon selection of the symbol mode and outputting the input character string upon selection of the character mode.

57. The method of claim 56, further comprising the step of:
detecting activation of one of a plurality of predetermined keys among the plurality of input keys, the predetermined plurality of keys not solely utilizable for selection among a plurality of input modes;
k) selecting the character input mode for the input device, automatically, upon detecting activation of one of the plurality of predetermined keys;
l) accessing the stored input character string upon the character input mode being selected in step (k).

58. The method of claim 57, further comprising the step of:
m) outputting the accessed stored character string.

59. The method of claim 55, further comprising the steps of:
i) determining via the comparison of step (e), if the stored symbol sequence is a prefix of at least one of the, Predetermined symbol sequences; and
j) selecting the character mode for the input device, thereafter ignoring the stored input symbol sequence, automatically, upon determining, in step (i), that the stored symbol sequence is not a prefix of at least one of the predetermined symbol sequences and determining that the stored character string is a string of valid characters.

60. The method of claim 59, further comprising the steps of:
k) detecting activation of one of a plurality of predetermined keys, among the plurality of input keys, the predetermined plurality of keys not solely utilizable for selection among a plurality of input modes;
l) accessing the stored input character string upon detecting activation of one of the plurality of predetermined keys in step (k).

61. The method of claim 60, further comprising the steps of:
m) outputting the accessed stored character string.

62. The method of claim 59, further comprising the steps of:
k) prestoring a plurality of words, each including and corresponding to a sequential string of the plurality of alphabetic characters;
l) comparing, upon storing of each sequential character in the stored character string, the stored character string to the plurality of prestored words of step (k), to continually generate a plurality of selectable words, each including the stored character string;

m) displaying the plurality of selectable words continuously generated in step l), each displayed with a corresponding numerical value;

n) detecting activation of one of a plurality of dedicated display selection keys, each with a numerical value corresponding to a displayable numerical value;

o) accessing the displayed prestored word with the numerical value corresponding to the numerical value of the detected activated dedicated display selection key; and p) outputting the accessed prestored word.

* * * * *